Sept. 24, 1957 F. R. KERNS ET AL 2,807,227
BATTERY ELEMENT ASSEMBLING AND BURNING MACHINE
Filed Nov. 21, 1952 16 Sheets-Sheet 3

INVENTORS
Fred R. Kerns
Roy Ward
BY Fred C. Haak
Hudson, Boughton,
Williams, David & Hoffmann
ATTORNEYS Sept. 24, 1957 F. R. KERNS ET AL 2,807,227
BATTERY ELEMENT ASSEMBLING AND BURNING MACHINE
Filed Nov. 21, 1952 16 Sheets-Sheet 4

INVENTORS
Fred R. Kerns
Roy Ward
BY Fred C. Hook
Hudson, Boughton,
Williams, David & Hoffmann
ATTORNEYS Sept. 24, 1957 F. R. KERNS ET AL 2,807,227
BATTERY ELEMENT ASSEMBLING AND BURNING MACHINE
Filed Nov. 21, 1952 16 Sheets-Sheet 5

INVENTORS
Fred R. Kerns
Roy Ward
Fred C. Haak
BY
Hudson, Boughton,
Williams, David & Hoffmann
ATTORNEYS INVENTORS
Fred R. Kerns
Roy Ward
Fred C. Hoak
BY
Williams, David & Hofmann
ATTORNEYS Sept. 24, 1957 F. R. KERNS ET AL 2,807,227
BATTERY ELEMENT ASSEMBLING AND BURNING MACHINE
Filed Nov. 21, 1952 16 Sheets-Sheet 7

INVENTORS
Fred R. Kerns
Roy Ward
Fred C. Haak
BY
Hudson Boughton,
Williams, David & Hoffmann.
ATTORNEYS INVENTORS
Fred R. Kerns
Roy Ward
Fred C. Haak
BY
Hudson, Boughton,
Williams, David & Hoffmann
ATTORNEYS INVENTORS
Fred R. Kerns
Roy Ward
Fred C. Haak
BY Hudson, Boughton,
Williams, David & Hoffmann
ATTORNEYS INVENTORS
Fred R. Kerns
Roy Ward
Fred C. Haak
BY Hudson, Coughton,
Williams, David & Hoffmann
ATTORNEYS

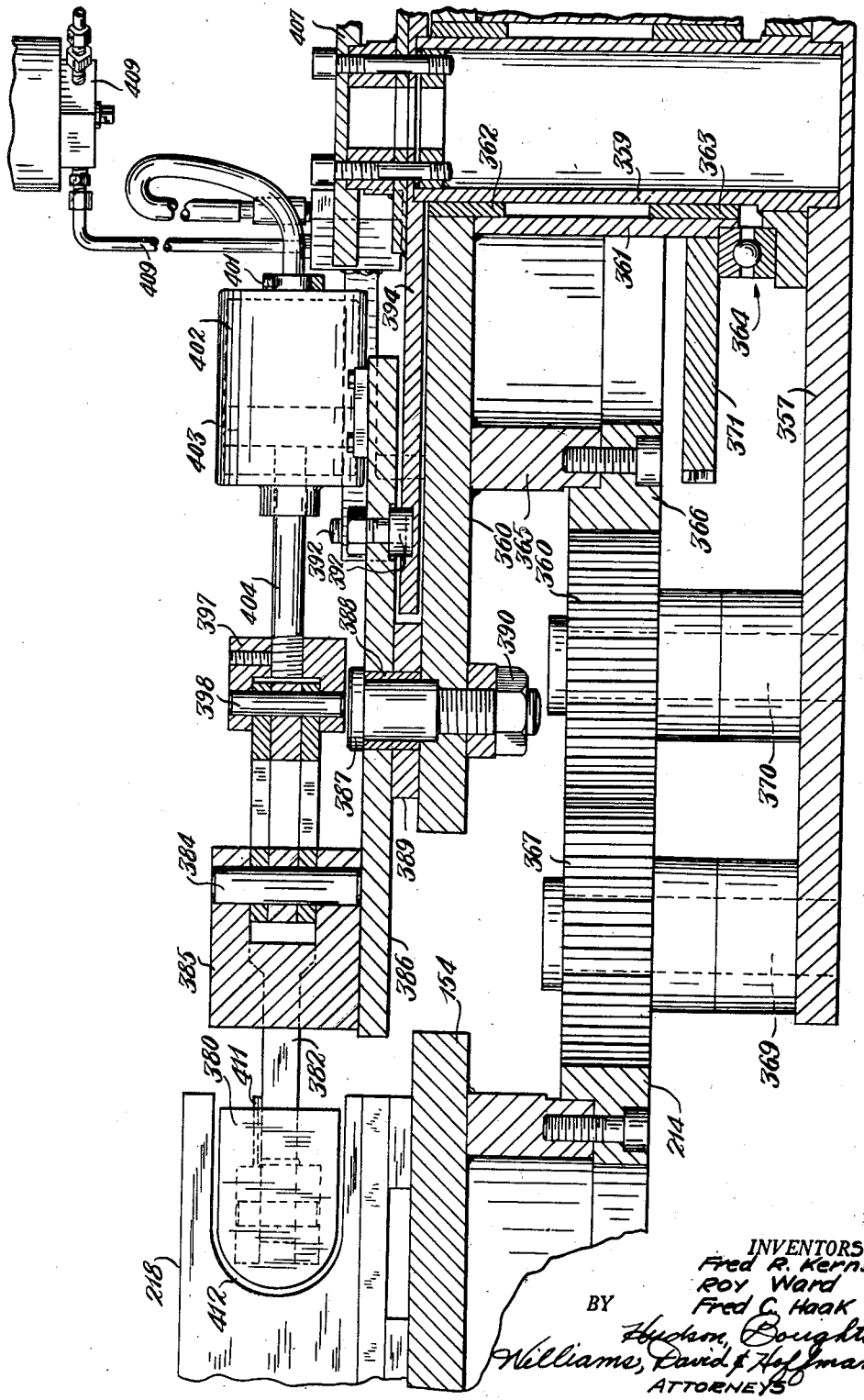

Sept. 24, 1957 F. R. KERNS ET AL 2,807,227
BATTERY ELEMENT ASSEMBLING AND BURNING MACHINE
Filed Nov. 21, 1952 16 Sheets-Sheet 15

INVENTORS
Fred R. Kerns
Roy Ward
Fred C. Haak
Hudson Boughton
By
Williams, David & Hoffmann
ATTORNEYS

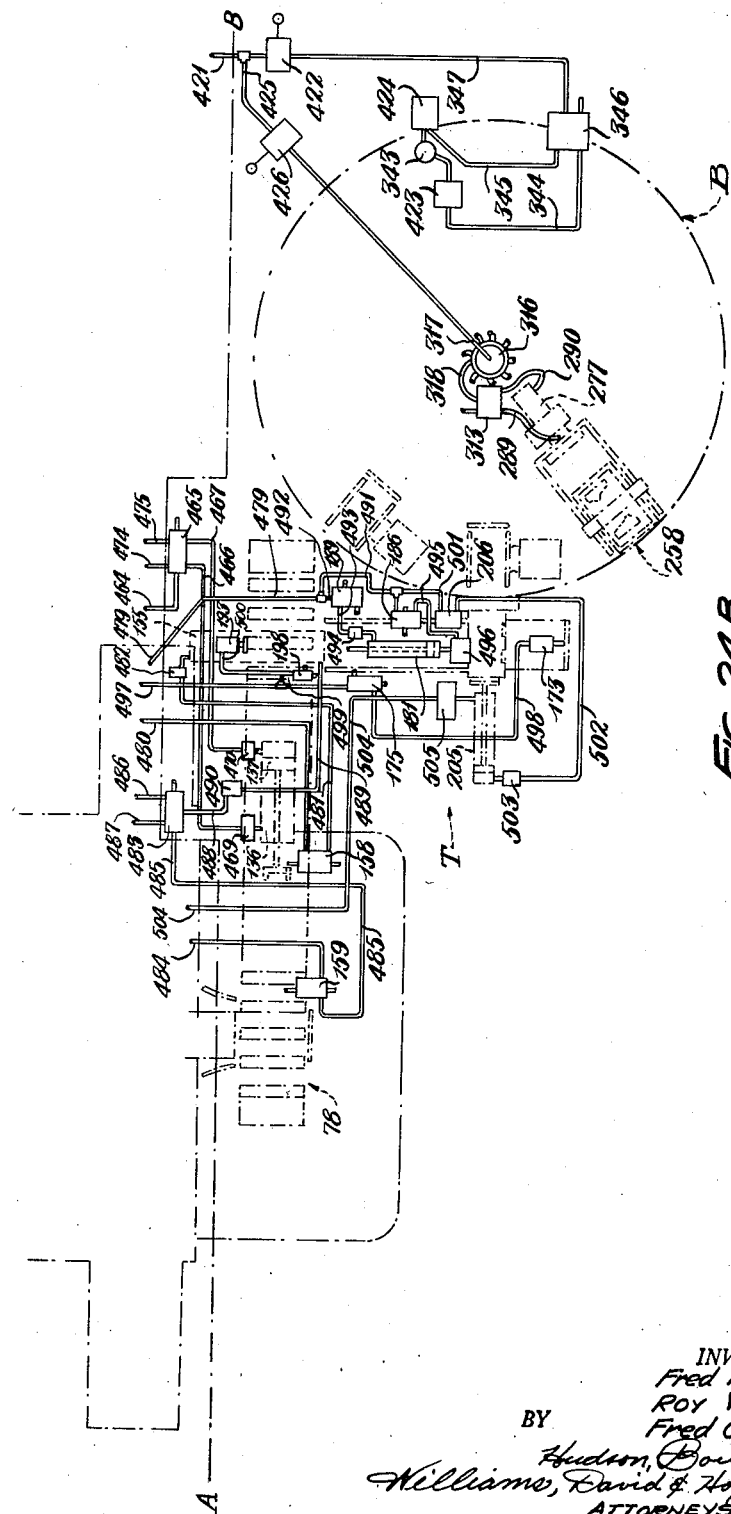

United States Patent Office 2,807,227
Patented Sept. 24, 1957

2,807,227

BATTERY ELEMENT ASSEMBLING AND BURNING MACHINE

Fred R. Kerns, Cleveland Heights, Roy Ward, East Cleveland, and Fred C. Haak, Euclid, Ohio, assignors to The Electric Storage Battery Company, a corporation of New Jersey Application November 21, 1952, Serial No. 321,872

7 Claims. (Cl. 113—59)

This invention relates to a machine for use in manufacturing storage batteries of the lead-acid type and, more particularly to a means for assembling battery plates and plate separators into elements for such a battery and for interconnecting the lugs of the plates thereof by fusing or burning plate lug straps thereto.

The conventional lead-acid type of storage battery, such as is conventionally employed in automotive vehicles, comprises a plurality of separate cells connected together in series, the several cells being generally contained in a multi-compartment housing or case. Each cell comprises a separate compartment containing electrolyte in which is disposed a battery element comprising a plurality of positive plates and negative plates separated by insulators commonly termed separators, the lugs of the several positive plates being connected to a common strap and the lugs of the several negative plates being connected to a second strap. These plate lug straps are each provided with a post which in turn is connected to a post of the adjacent cell or to an outside circuit.

An object of the invention is to provide a single machine to substantially eliminate the hand labor required to assemble battery plates and separators into elements and to interconnect the plates thereof in the manufacture of storage batteries of the lead-acid type thereby reducing the cost of such batteries.

Another object of the invention is to provide a novel machine for use in manufacturing storage batteries wherein battery elements are automatically assembled from supplies of battery plates and plate separators, the assembled elements are automatically transferred to a plate lug burning or fusing station in proper oriented position for cooperation with plate lug burning means located at the station, and the assembled and lug burned or fused elements are thereafter automatically removed from the burning station.

A further object of the invention is to provide a novel machine of the type mentioned in the preceding paragraph wherein the several mechanisms thereof are easily and rapidly adjusted for assembling and effecting plate lug fusing or burning of elements having different numbers and/or sizes of battery plates and separators.

A still further object of the invention is to provide a novel machine for use in manufacturing storage batteries wherein battery elements are assembled from separate supplies of battery plates and plate separators with the plates and separators extended horizontally, the elements are then automatically transferred to a plate lug strap fusing or burning station in which the elements are disposed with the plates thereon extending vertically by a mechanism operated in timed relationship to the operation of the mechanism at the assembling and burning stations, and the completed elements are automatically removed from the burning station by a take-off mechanism operated in timed relationship with the burning operation.

A further object of the invention is to provide an improved transfer station for moving storage battery elements of assembled but non-connected plates and separators from an assembling station to a plate lug strap burning station, the said transfer apparatus being characterized by having the assembled elements received upon a conveyor operating in timed relationship to the assembling station and by having mechanism by which the elements are removed from the conveyor and delivered to a moving element supporting means of the burning station by a means movable to and from said conveyor in timed relationship with the movement of the latter and tiltable to position the plate lugs of an element uppermost prior to its movement onto the supporting means.

The invention further resides in certain novel features of the construction of the machine in which the invention is embodied and in the combination and arrangements of the parts thereof; and further objects and advantages of the invention will be apparent to those skilled in the art to which it pertains from the following description of the present preferred embodiment as illustrated in the accompanied drawings, forming a part of this disclosure, in which.

Figure 1:
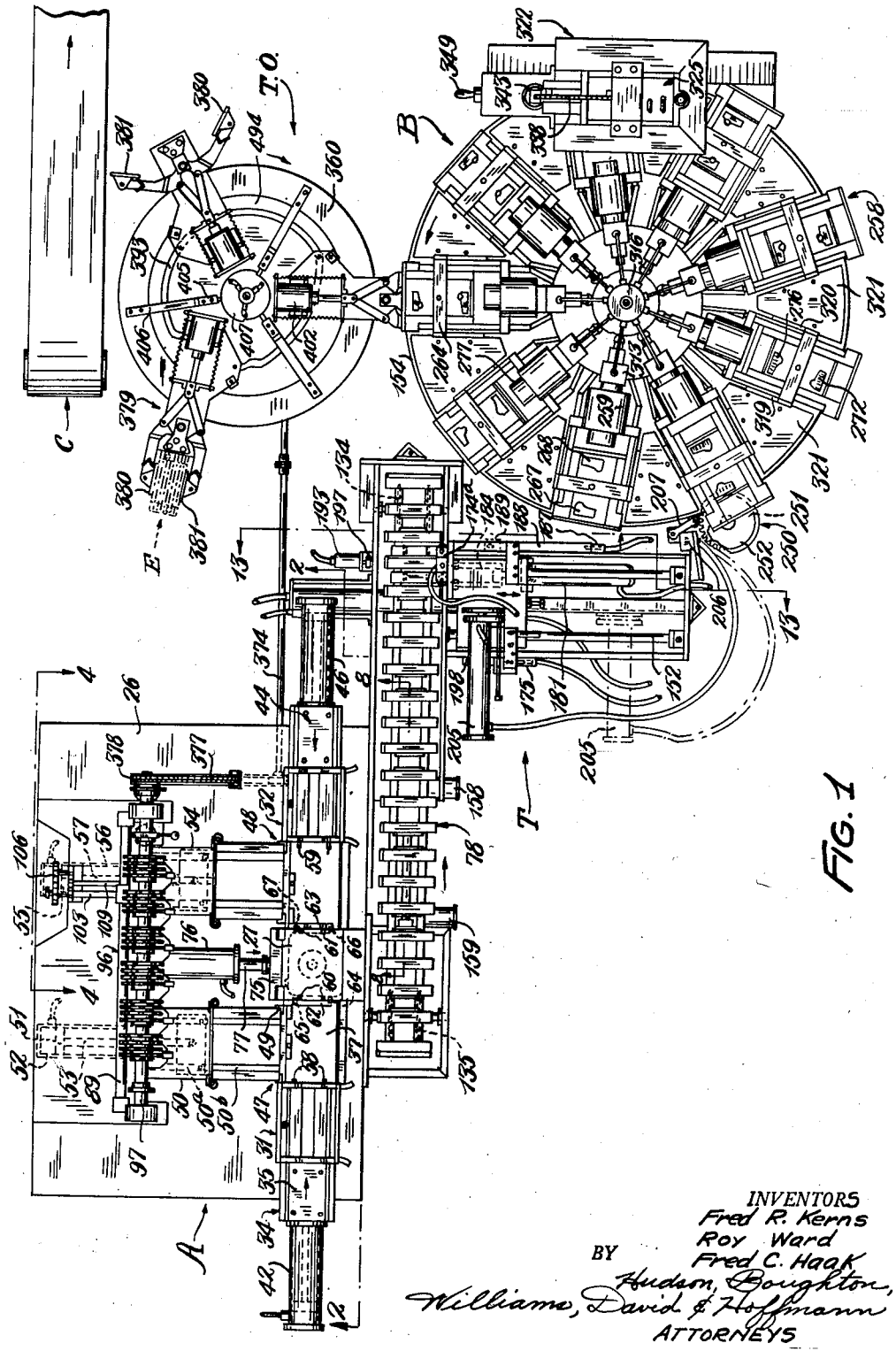
Fig. 1 is a top plan view of a machine constructed in accordance with this invention with certain parts omitted to more clearly show the construction.
Figures 6, 7, 16:
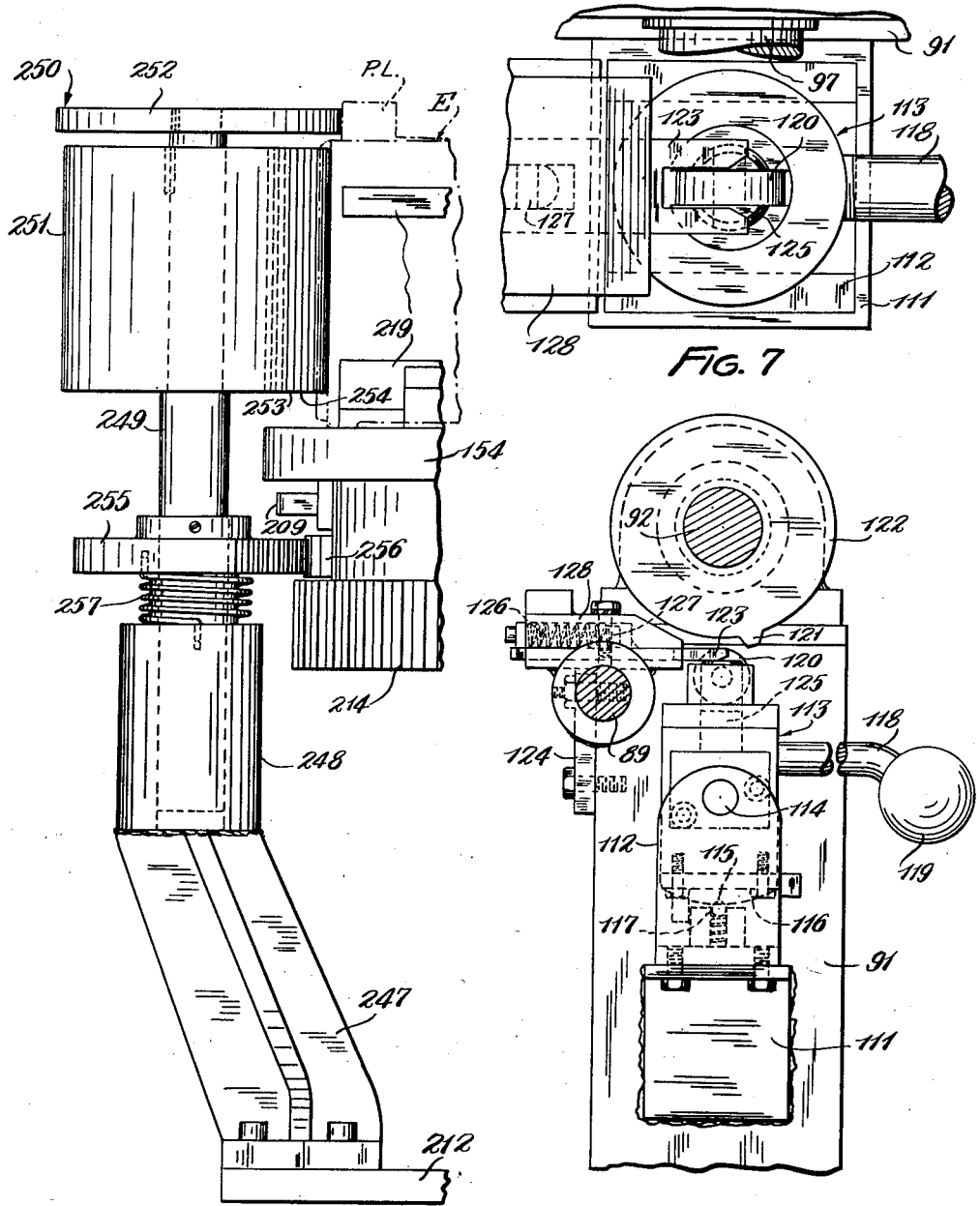
Fig. 6 (Sheet 9) is an enlarged, sectional view taken substantially on the section indicating line 6—6 of Fig. 4 and illustrating the construction of the means for starting and stopping the assembling station.
Fig. 7 (Sheet 9) is an enlarged, top plan view of the portion of the mechanism shown in Fig. 6 with the operating cam removed to illustrate the latching means which retains the associated valve in operated condition until released by the operator.
Figure 13:
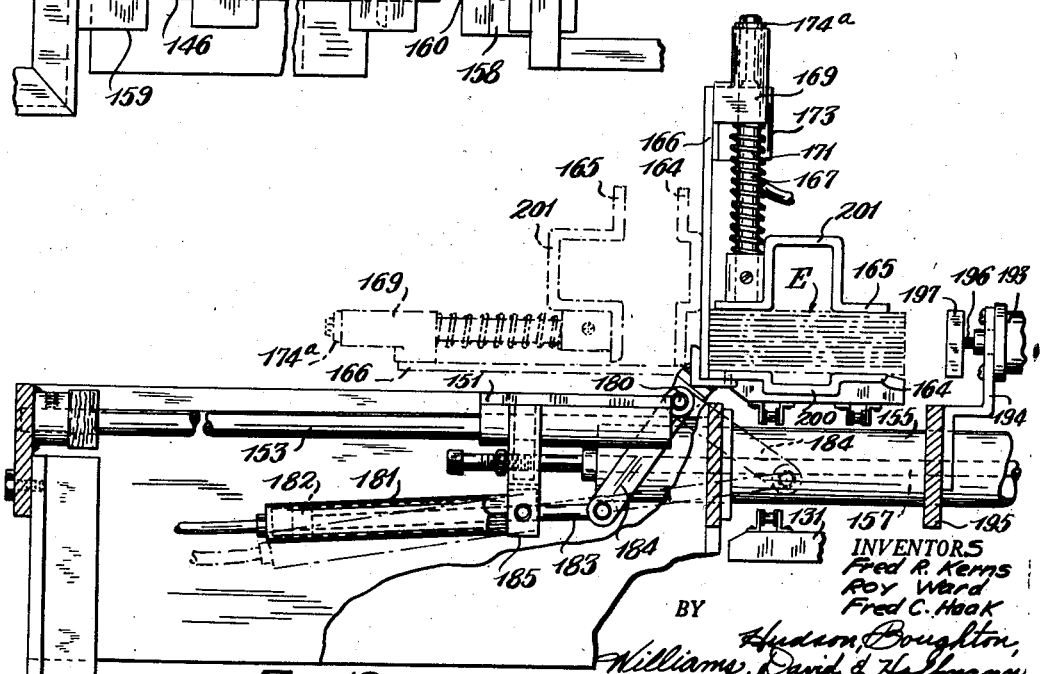
Figure 10:
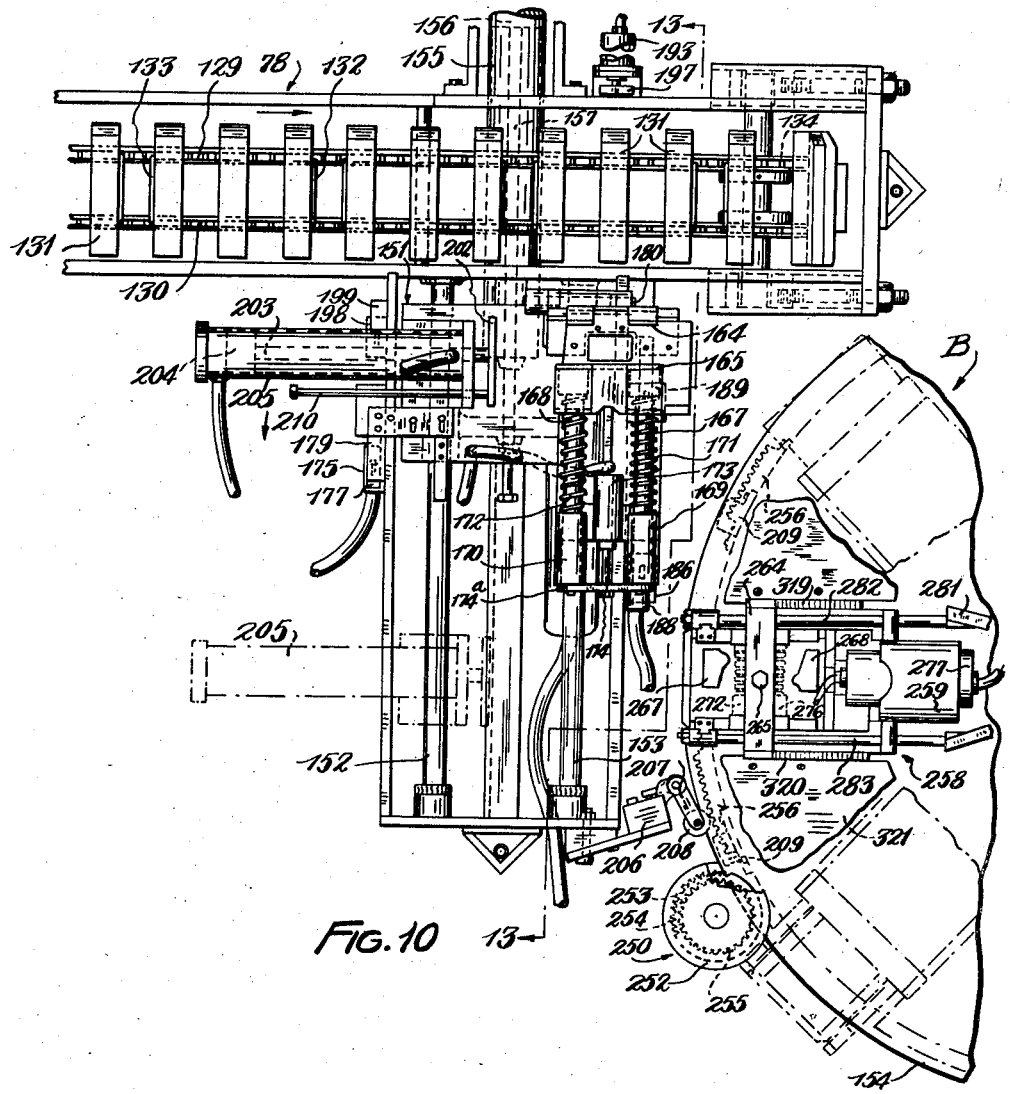
Figures 11, 12:
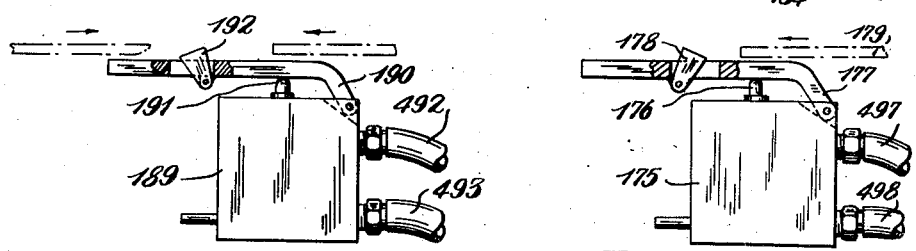
Figure 14:
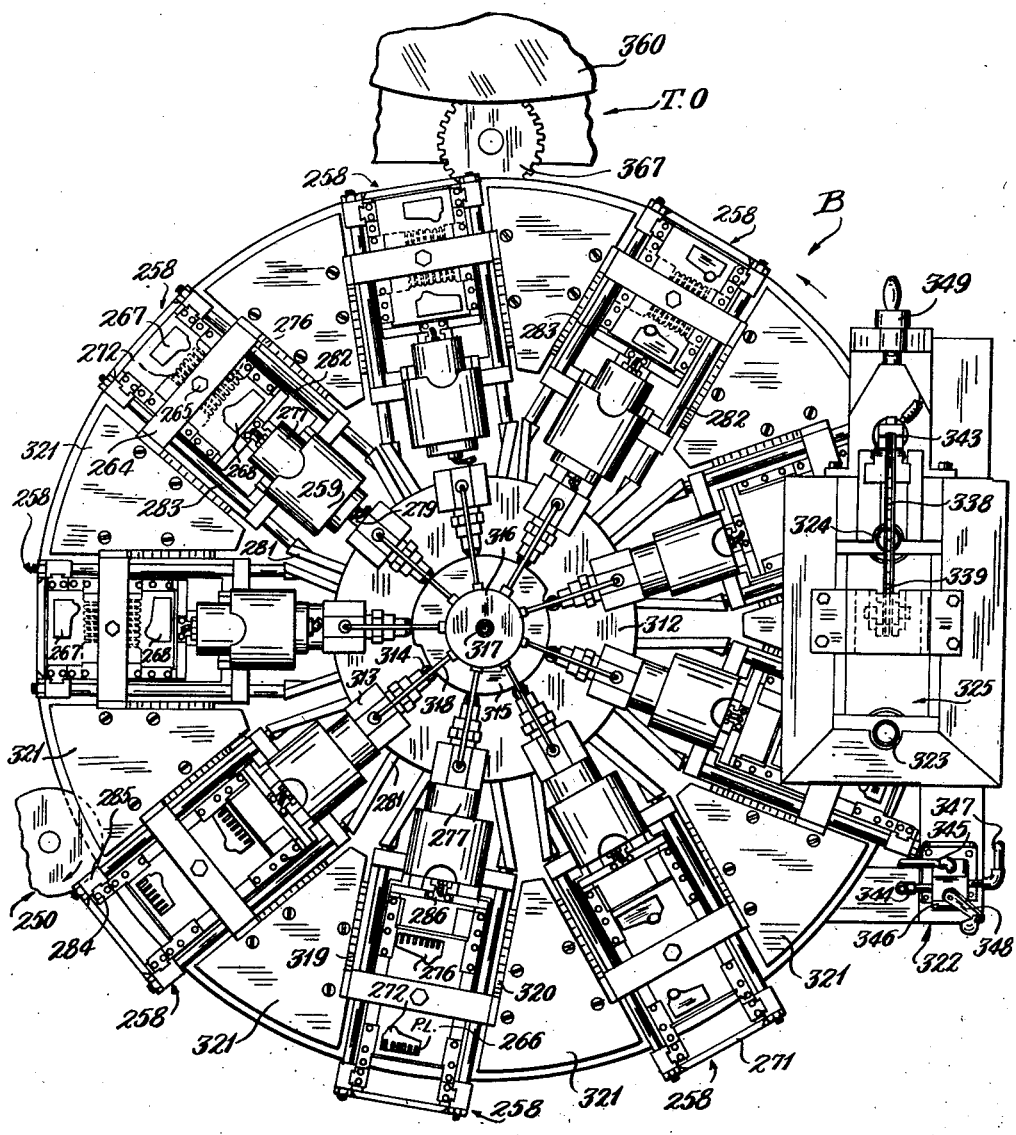
Figure 15:
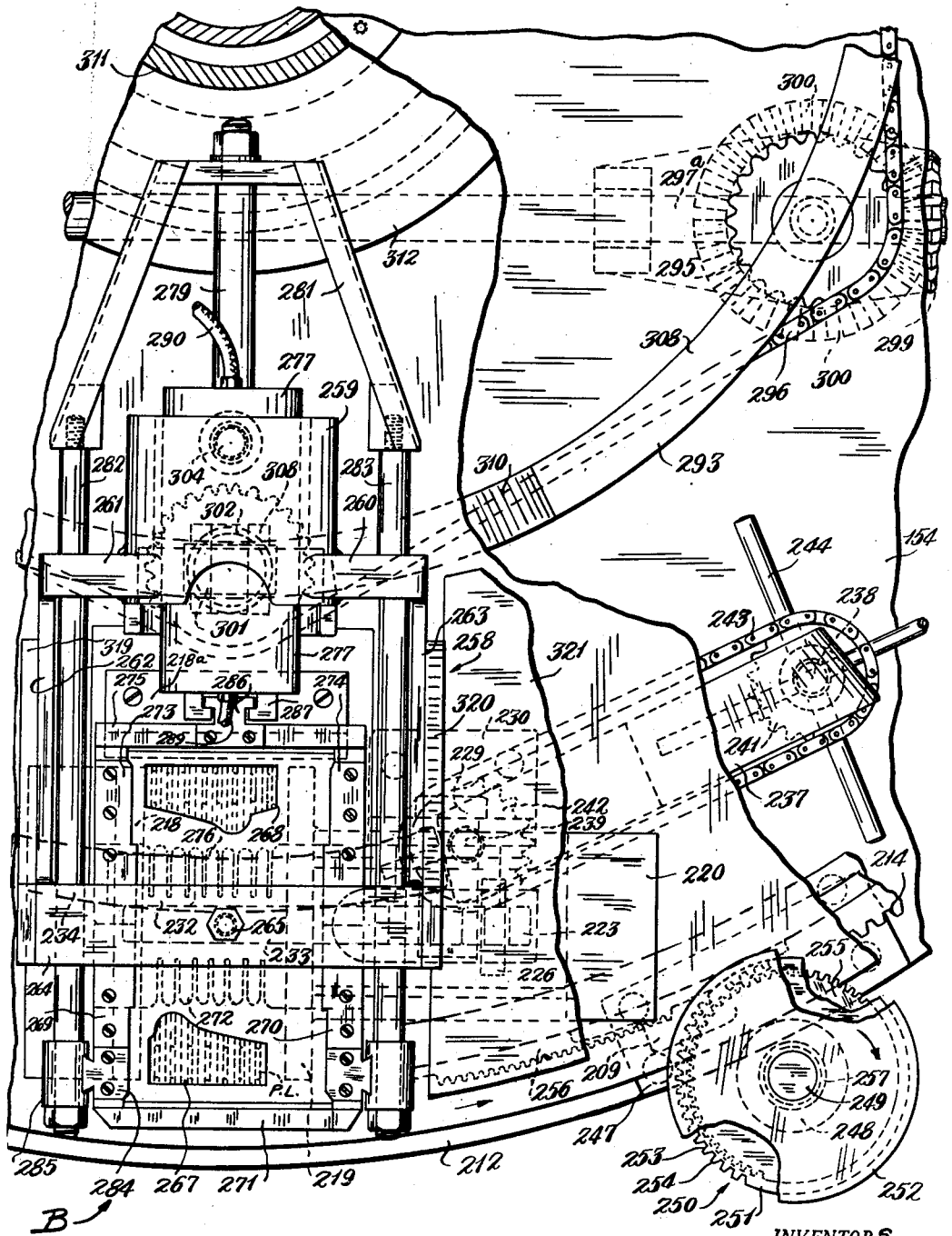
Figure 17:
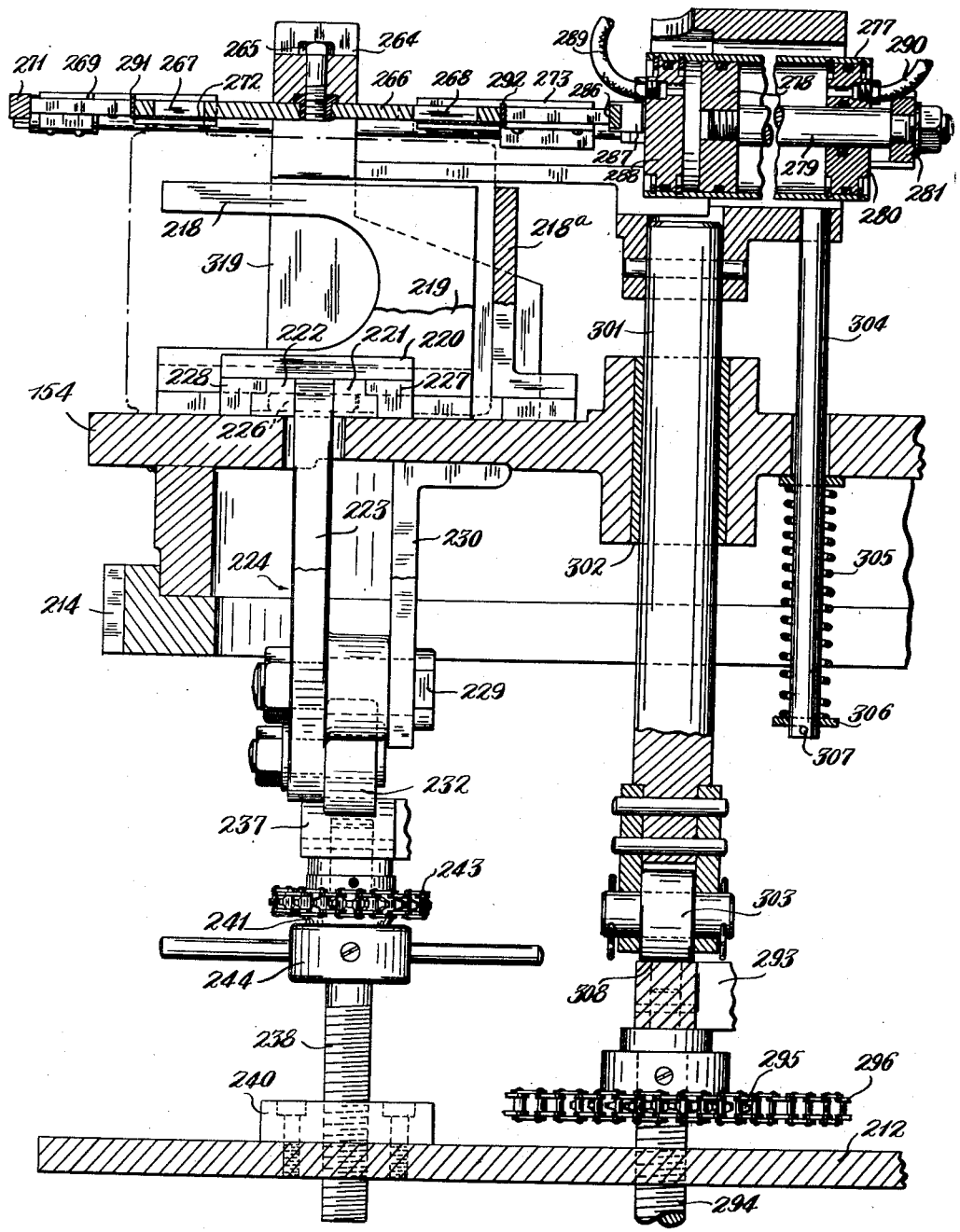
Figure 18:
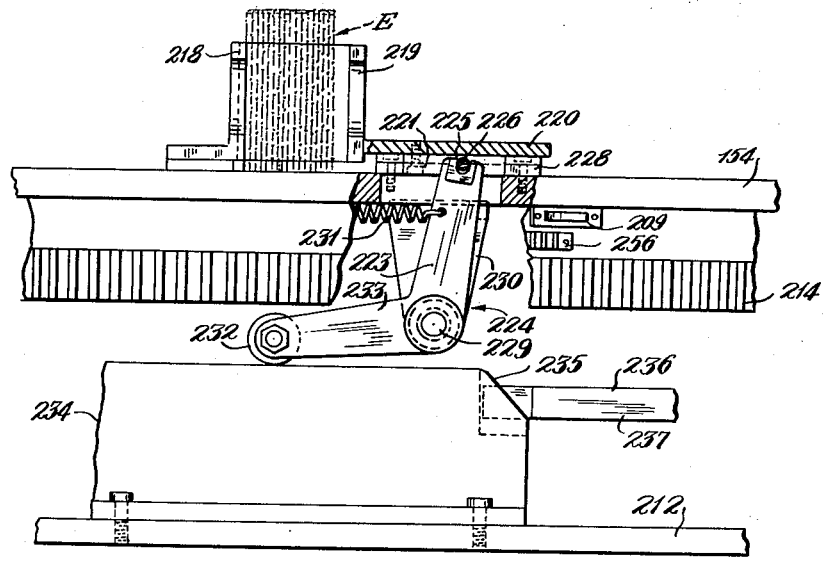
Figure 19:
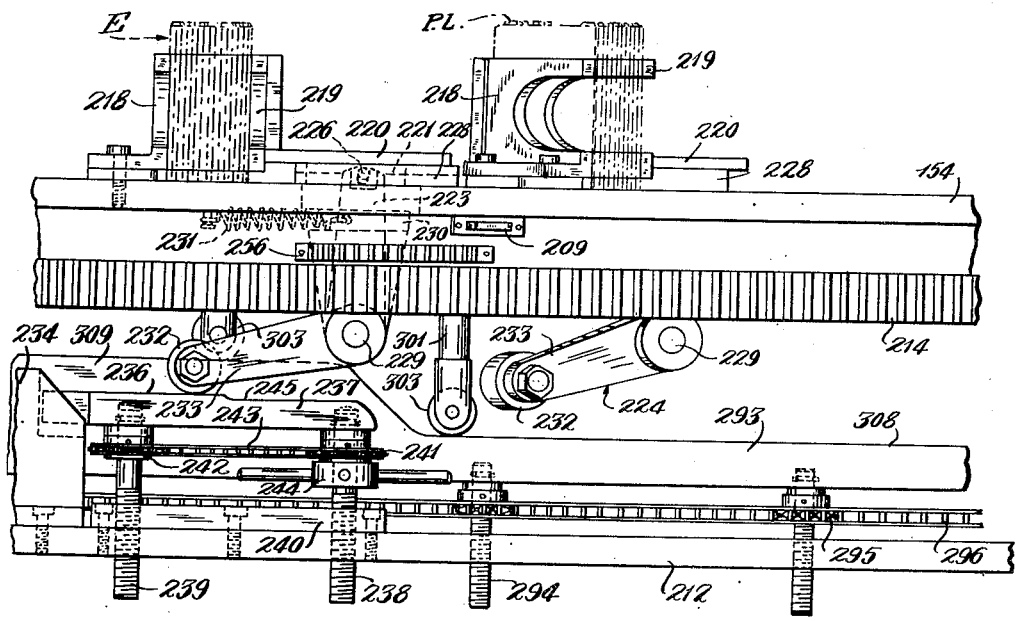
Figures 20, 21:
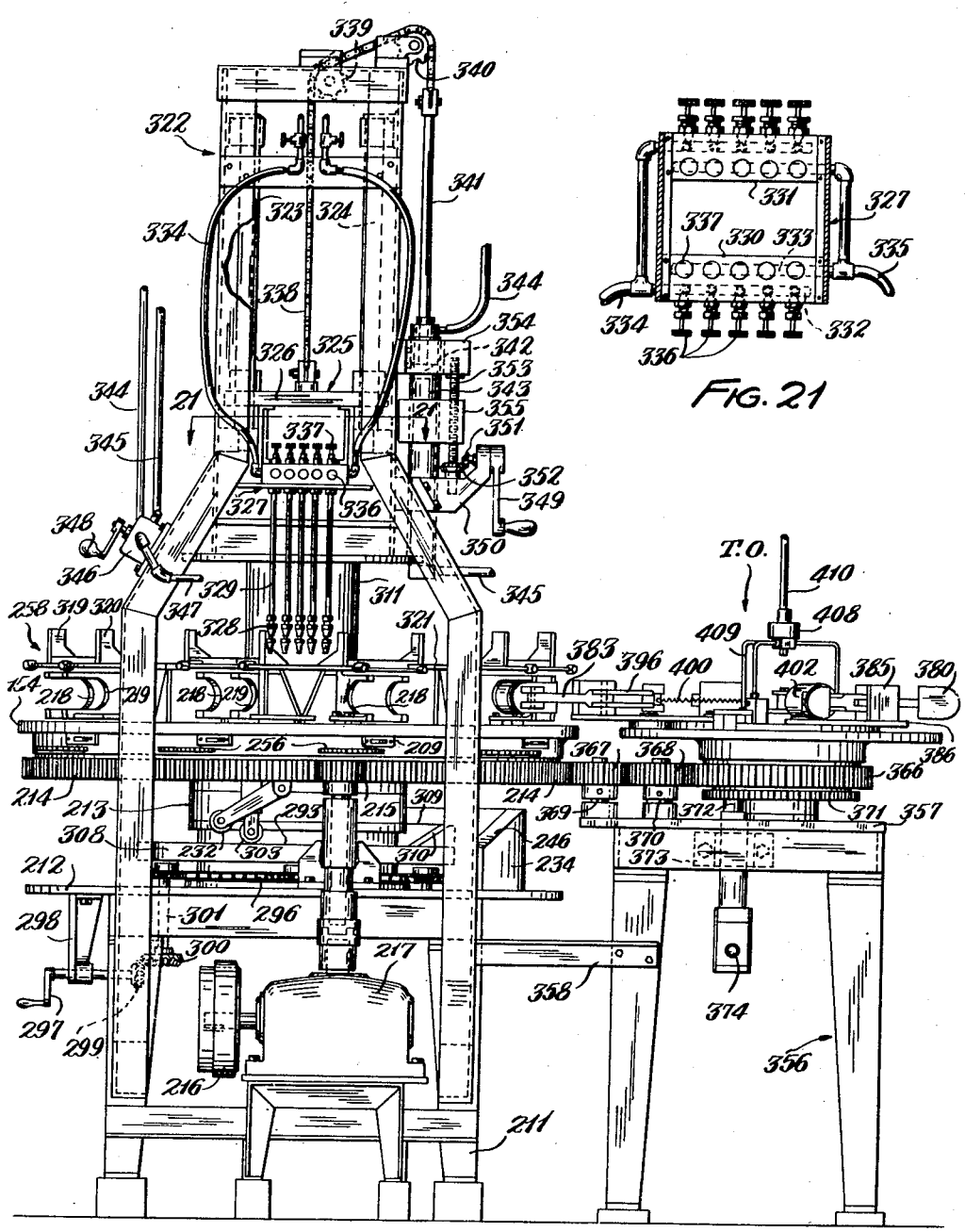
Figure 22:
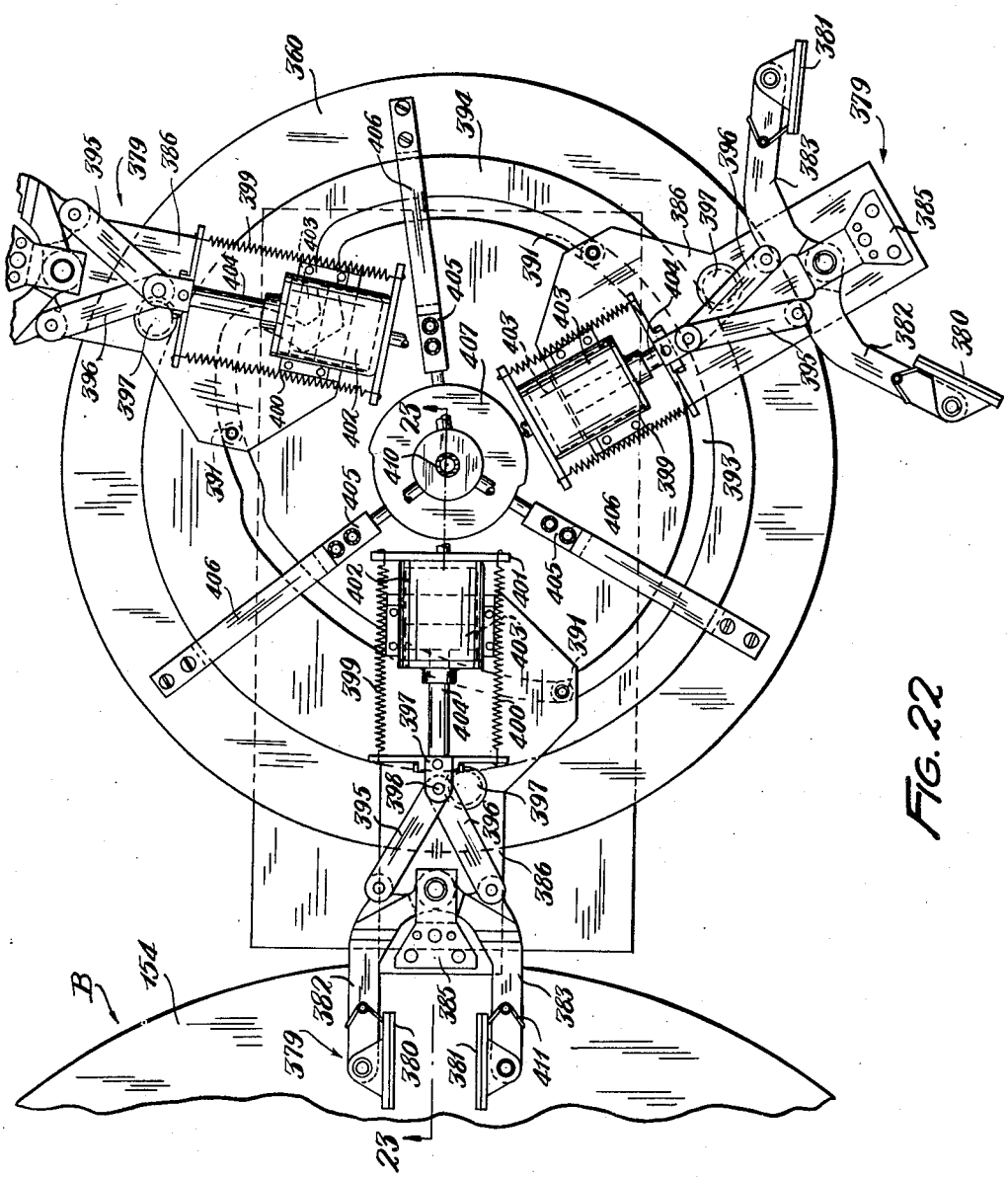
Figure 24A:
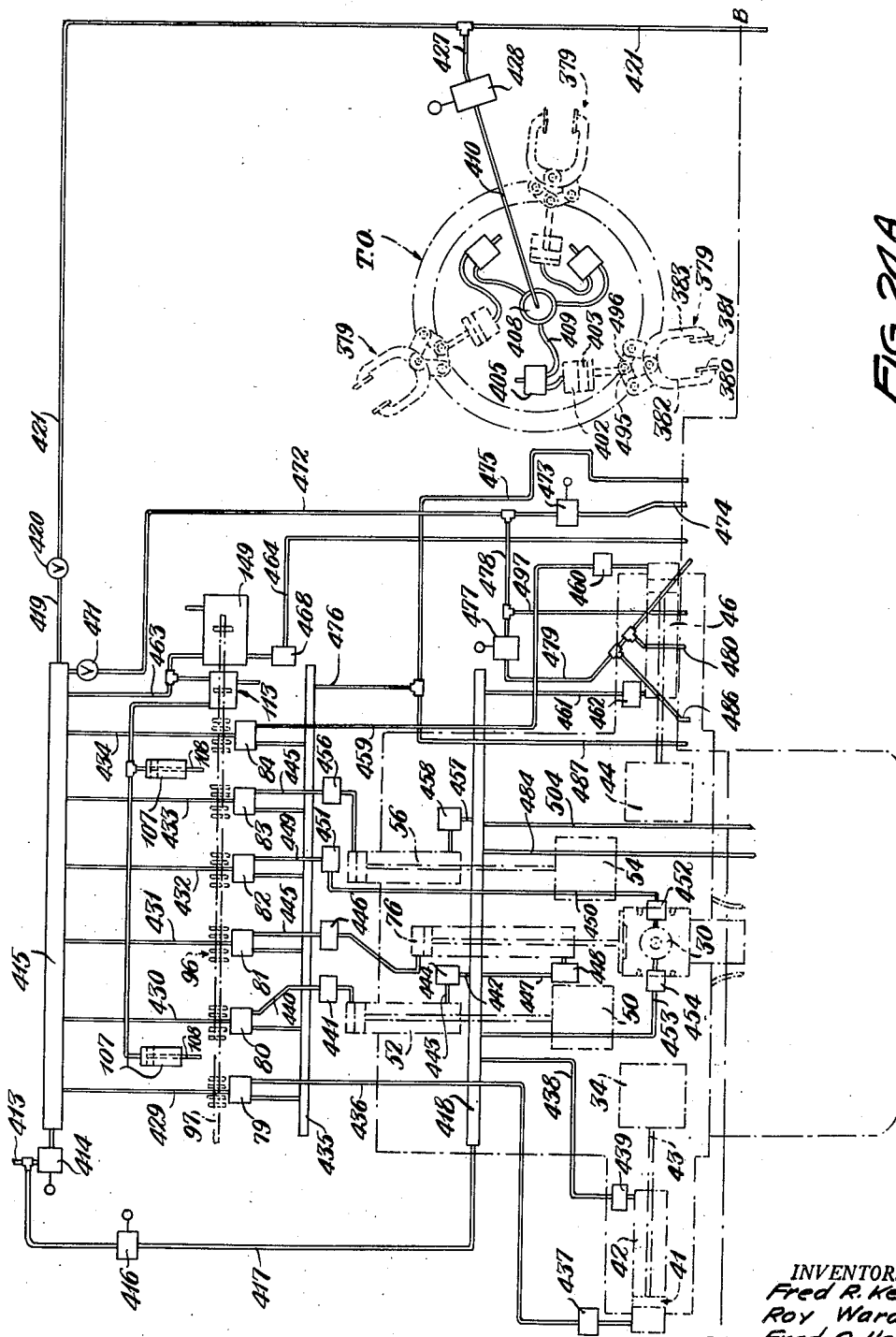

Fig. 10 is an enlarged, fragmentary, plan view of a portion of a machine more clearly illustrating the transfer station for moving assembled battery elements to the plate lug burning station, the jaw members of the transfer station being shown in non-tilted position adjacent the intermittently moving conveyor to facilitate illustration, it being understood that the jaw members will normally be in the position shown in full lines in Fig. 13 when these members are in the location illustrated in Fig. 10;

Fig. 11 is an enlarged, detached side view of one of the valve means controlling operation of the element transfer station;

Fig. 12 is a view similar to Fig. 11 but showing a different one of a valve means for controlling operation of the transfer station;

Fig. 13 (Sheet 5 is an enlarged view of the transfer station, the view being substantially in side elevation, as seen from the location indicated by the line 13—13 of Figs. 1 and 10, but with the jaw members shown engaged with a battery element and with a portion of the supporting structure broken away to more clearly illustrate the construction;

Fig. 14 is a detached top plan view of the burning station of the machine illustrating the relative location of the burner head elevating means and of the element protective means of the station when the latter are in the several positions thereof;

Fig. 15 is an enlarged, fragmentary plan view of a portion of the burning station illustrated in Fig. 14 showing the details of construction of one of the element protective means, the operating mechanism for the plate and separator aligning device, and the adjusting mechanism for the cams which operate the element clamping and protecting means;

Fig. 16 is a detached, enlarged side elevational view of the plate and separator aligning device for the burning station, a plate and separator of an element being indicated in broken lines to show the mode of operation of the device;

Fig. 17 is an enlarged view partly in side elevation and partly in vertical section through a portion of the burning station, with portions broken away on different vertical planes, to illustrate the element clamping and protective devices and the operating mechanisms therefore;

Fig. 18 is a somewhat schematic view, partly in side elevation and partly in vertical section, of a portion of the burning station showing the manner in which each element clamping means is operated;

Fig. 19 is a fragmentary side elevational view of a portion of the burning station showing the cams, and the adjusting means therefor, which actuate the element clamping and protective means;

Fig. 20 is a side elevational view of the machine, as viewed from the right hand side of Fig. 1, further illustrating the burning station and also showing the take-off station for removing a completed element from the machine;

Fig. 21 is an enlarged sectional view, taken substantially along the section indicating line 21—21 of Fig. 20, showing the means for individually adjusting the separate flame producing means of the burning station;

Fig. 22 is an enlarged plan view of the take-off station with certain parts broken away to facilitate illustration and with a portion of the burning table schematically represented to illustrate the orientation of the take-off station relative thereto;

Fig. 23 is a fragmentary, enlarged view in vertical section through the take-off station, the view being taken substantially on the section indicating line 23—23 of Fig. 22; and Figs. 24A and 24B, taken together and joined along the line A—B, constitute a schematic diagram of the fluid pressure operated mechanisms and the control valves therefor for effecting actuation of the several mechanisms of the machine.

The general nature and operation of the machine can best be understood with reference to Fig. 1 of the drawings which is a somewhat schematic representation of the machine when looking down upon the top thereof, various of the details of the construction being omitted or only partially shown in order to facilitate illustration of the salient features of the machine in which the invention is embodied. It will be readily apparent that this machine constitutes an integral unitary structure but, for convenience, it may be considered as comprising four principal portions or stations which operate in predetermined timed relationship. Thus, there is an element assembling station A and a plate lug strap burning or fusing station B to which the elements are delivered from the assembling station A by a transfer mechanism T, the completed elements being removed from the burning station B by a take-off station T. O.

Briefly stated, the assembling station A operates by delivering battery plates and separators from separate supplies thereof to a common support in stacked arrangement and in proper order to constitute a battery element E, the plates and separators of which extend horizontally. The assembled element is then delivered to a conveyor of the transfer mechanism T from which the element is removed and tilted through an arc to dispose the plates and separators in substantially vertical position. After being thus positioned the battery element is delivered to the rotating table of the burning station B where the plates and separators of the element are properly aligned, clamped together, and a protective member or shielding means placed thereon after which the element E moves beneath a burning head where a plurality of flames fuse plate lug connecting straps to the plate lugs of the element. Thereafter, the take-off mechanism T. O. engages a pair of relatively movable members thereof with either side of the completed element, from which element the protective means and clamping means are now released, removes the completed element from the burning station and delivers it to a suitable conveyor C for transportation to a location where the element will be placed in a battery case. The details of the several stations or mechanisms and the manner in which they operate to perform these functions will hereinafter be apparent from the following detailed description of the illustrated embodiment of the machine.

*The assembling station*

The assembling station, as illustrated in Figs. 1 through 7 of the drawings, comprises a frame, generally designated 25, which may be constructed of angle irons, welding plates, and/or other structural members suitably connected together to form a table-like support having a substantially flat top portion 26. Adjacent the forward portion of the support, and substantially centrally relative to the sides thereof, is a vertically moving member or platform 27 upon which the battery plates and separators are delivered in stacked arrangement to constitute an assembled element. The platform 27 is connected to a piston 28 by means of a piston rod 29 and is movable within a cylinder 30, connected to the table portion 26 of the frame. Movement of the piston 28, and hence the platform 27, is effected by fluid pressure as hereinafter explained.

At either side of the movable platform 27 are disposed magazines 31 and 32 for supplies of negative battery plates and positive battery plates, respectively. The magazines 31 and 32 are identically constructed and each comprise vertically extending members, such as 33, suitably connected to provide a substantially rectangular compartment in which a quantity of battery plates may be supported in stacked horizontal relationship. The magazines 31 and 32 are supported upon the table-like portion 26 of the apparatus with the lower portions of the magazines spaced thereabove thereby permitting reciprocation therebeneath of the plate feeders or pusher members. The plate feeder or pusher members for each of the magazines 31 and 32 are identical and hence only one need be described and illustrated in detail.

Figure 3:
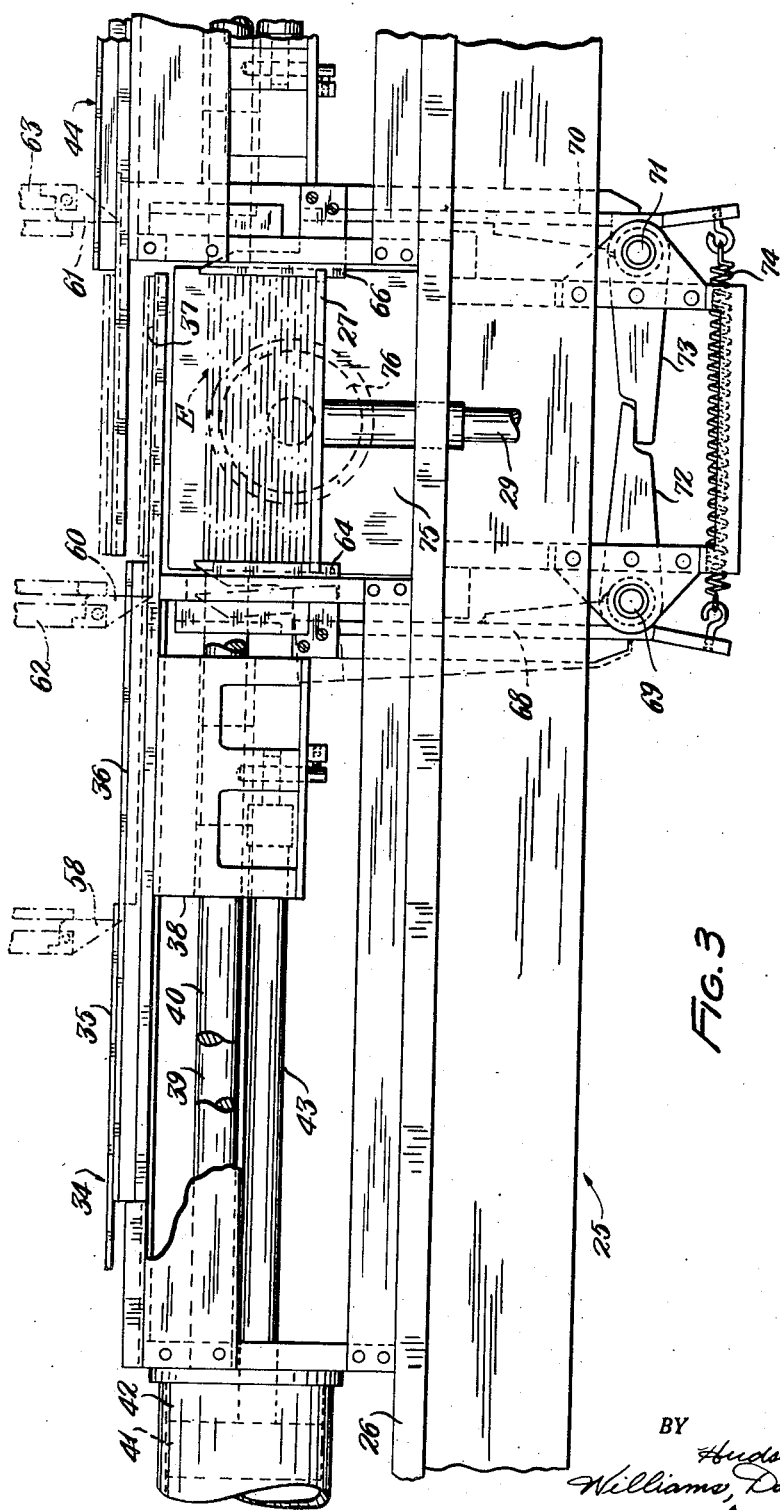
Fig. 3 is an enlarged, detached, somewhat schematic, front elevational view of that portion of the mechanism of the assembling station for delivering the battery plates and separators into stacked arrangement and for aligning the edges of the plates and separators as they are stacked.

Referring now to Fig. 3 of the drawings, it will be seen that the feeder or pusher mechanism 34 for the negative battery plates comprises an elongated body formed of interconnected parts providing three horizontal surfaces 35, 36 and 37 at different elevations. The member 34 is adapted to reciprocate beneath plate magazine 31 by having a bracket member 38 connected to the lower surface thereof and slidably supported upon horizontally extending spaced guide members, such as rods 39 and 40, which are suitably supported upon the frame 25. The member 34 is moved from one to the other of its two positions by a fluid pressure operated means comprising a piston 41 in a cylinder 42, mounted upon the table-like top 26 of the apparatus by suitably supporting members or brackets, the piston 41 being connected to the bracket 38 of the slide or feeding member 34 by a piston rod 43. The slide or plate feeding member 44 for feeding or delivering positive battery plates is similarly constructed and supported, this member 44 being operated by a fluid pressure means comprising a piston 45 connected with the slide and operating within a cylinder 46.

The slide members or feeding means 34 and 44 are movable from positions in which the intermediate portions or surfaces thereof, such as 36, are beneath the respective magazines 31 and 32 to a position in which the portions or surfaces such as 35 are beneath the magazines and the forward portions such as 37 are disposed above and in alignment with the movable platform 27 as illustrated in Fig. 3. It will be noted that the positive plate magazine 32 and its slide or feeding means 44 are at a somewhat higher elevation than the negative magazine 31 and its slide 34 so that the slide or feeding means 34 and 44 may be simultaneously moved to their innermost positions without interference. In this position the forward surfaces, such as 37 are disposed one above the other with the negative slide 34 in the lower position, as will be evident from Fig. 3 wherein the objects indicated in broken lines on each slide are a superposed battery plate and separator.

The top or table portion 26 of the supporting frame for the assembling machine is also provided with two separate magazines 47 and 48 for plate separators, see Fig. 1. These magazines, like the plate magazines, each comprises a plurality of vertically extending members, such as 49, suitably connected to provide vertically elongated compartments open at the top for the reception of the plate separators in stacked arrangement with the individual separators extending horizontally. The magazine 47 is disposed at one side of the slide or feeding means 34, that is rearwardly of this member as viewed in Figs. 1 and 2 of the drawings, and at a location transversely of the top or table portion 26 of the frame such that the magazine is intermediate the plate magazine 31 and the movable support or platform 27. The magazine 47 is supported by suitable brackets or the like upon the top or table portion 26 of the frame in a manner permitting reciprocation of a slide or feeding member 50 therebeneath.

The feeding member 50 is preferably constructed of a relatively thin plate having a smooth upper surface and provided on its under surface with a pair of spaced guide members 50a which reciprocate in correspondingly shaped grooves or openings 50b in the bottom of the magazine 47. The members 50a, and hence the plate 50, are connected through a suitable bracket to a fluid pressure operated mechanism comprising a piston 51 which is slidable within a cylinder 52 and connected with the slide or feeder member 50 by a piston rod 53, see Fig. 1. The separator magazine 47 is so disposed that the slide or feeding member 50 moves beneath the latter transversely of the path of movement of the negative plate feeding member or slide 34 and at an elevation slightly above the surface of that slide or feeding member.

Figure 2:
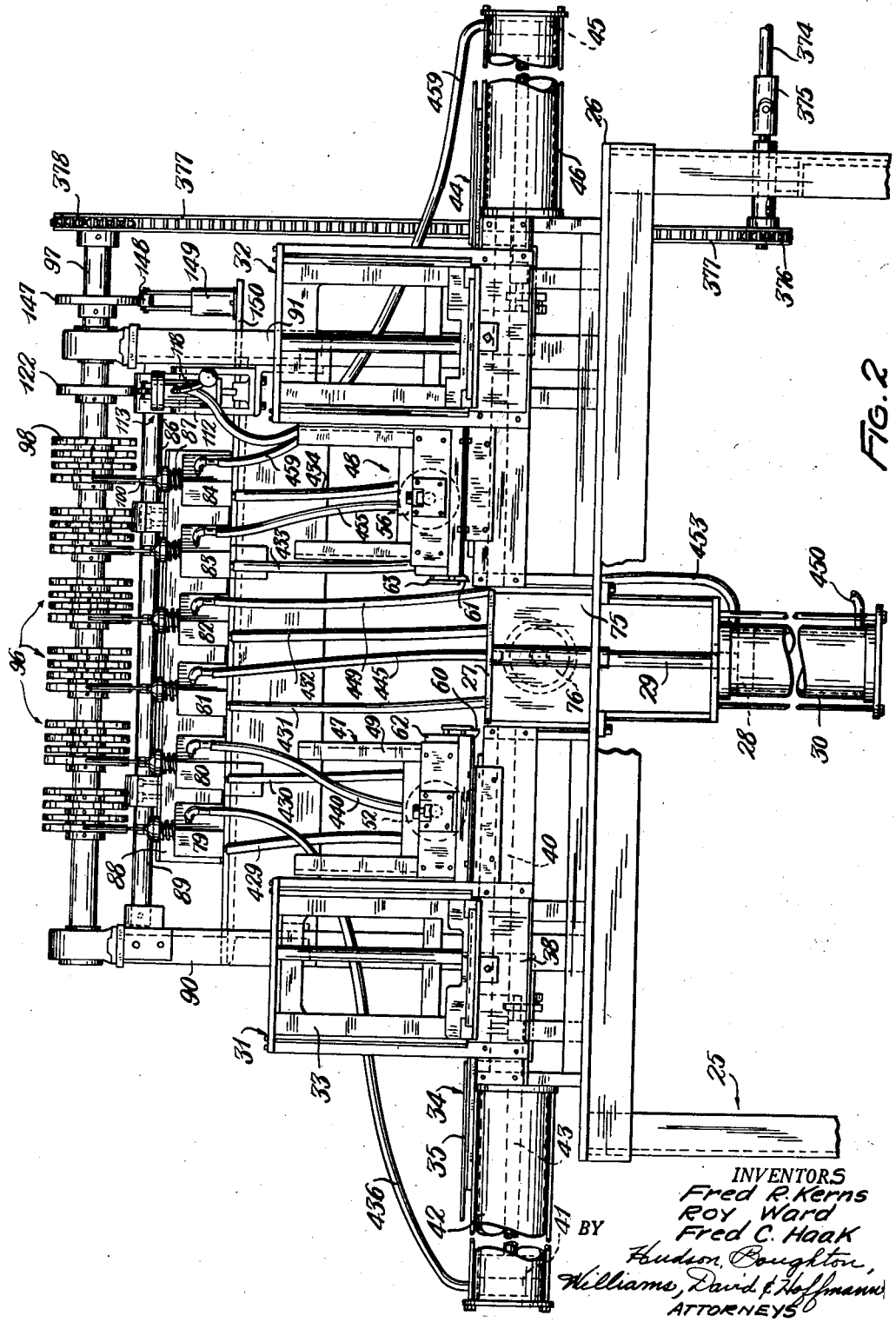
Fig. 2 is an enlarged, detached, front elevational view of the assembling station of the machine with certain parts broken away to facilitate illustration, the view being taken substantially on the line 2—2 of Fig. 1.

The separator magazine 48 is constructed in the same manner as the magazine 47 but is supported to the rear of the path of movement of a positive plate feeder member or slide 44 and intermediate the location of the plate magazine 32 and the platform 27 as will be apparent from Figs. 1 and 2 of the drawings. The separator magazine 48 is likewise supported above the surface of the frame top 26 and at a somewhat higher elevation than the magazine 47. The magazine 48 is provided with a reciprocating member or slide 54 which moves transversely of the path of movement of the plate feeder or slide 44 by fluid pressure operated means comprising a piston 55 slidable within a cylinder 56 and connected to the slide 54 by a piston rod 57. The separator magazine 48 is disposed at a sufficient elevation above the top of the table-like portion 26 of the frame for the assembling apparatus to permit the separator slide or feeding member 54 to move a separator from the magazine 48 and to a position above the plate slide 44 as hereinafter described.

It will be apparent from the structure thus far described that the magazines 31, 32, 47 and 48 provide means for establishing separate supplies of negative battery plates, positive battery plates and plate separators which plates and separators may be fed one at a time from the magazines and carried into stacked arrangement upon the support or platform 27. That is to say, negative plates are disposed by the machine operator in the plate magazine 31 so as to extend horizontally with their plate lugs in alignment and disposed adjacent the left-hand rear corner of the magazine as viewed in Fig. 1. Supplies of positive battery plates are placed in the positive plate magazine with their lugs in alignment and disposed adjacent the right-hand rear corner of the magazine. The separators employed may be of any desired type, but when they are of the type having ribs on one face thereof with the other face substantially planar, a quantity of such separators are supplied to the magazine 47 with their ribs directed upwardly while the separators supplied to the magazine 48 having their ribs directed downwardly.

With the several magazines thus supplied with plates and separators as just mentioned and with the slides or feeding members 34, 44, 50 and 54 in their rearmost positions, as indicated in Fig. 1, the lowermost battery plates will rest upon the intermediate portion of the plate feeder or slides, for example, upon the surfaces 36 of the slides 34 and 44. Likewise, the lowermost separator in each of the magazines 47 and 48 will be disposed in the path of the corresponding feeder or slide 50 and 54. Hence, when the fluid pressure operated mechanism for operating the slide 34 is then actuated, in a manner hereinafter described, the raised portion between the surfaces 36 and 35 of the feeder or slide will engage the edge of the negative plate resting thereon and move the latter forwardly to a position in which the plate thus fed is substantially in line with the path of movement of the slide 50 for the separator magazine 47. The remaining plates in the magazine 31 will then be resting upon the surface 35 of the feeding member or slide 34. Substantially simultaneously therewith, the slide 44 will similarly have moved the lowermost positive battery plate from the magazine 32 into a position aligned with the separator magazine 48.

At substantially the same time, the separator feeder or slide 50 will have moved forwardly thus moving the lowermost separator from the magazine 47 to a position above the battery plate on the slide 34 and, likewise, the lowermost separator in the magazine 48 will have been similarly moved to position a separator above the positive battery plate upon the slide 44.

The side of the plate magazine 31 adjacent the platform 27 is provided with a pair of pivoted stripper members or dogs 58 which are adapted to rock freely out of the path of the plate slide 34 and a battery plate thereon when the slide moves in the direction towards the platform 27. These dogs or stripper members will, however, prevent reverse movement of a battery plate carried by the slide 34 when the latter is returned to its initial position. Similarly, dogs or stripper members 59 are provided in a corresponding location on the positive plate magazine 32. Consequently, it will be apparent that, when the plate slides 34 and 44 are returned to their initial positions by the fluid pressure operated mechanisms, the dogs or stripper members 58 and 59 will prevent the fed negative battery plate and the fed positive battery plate, together with the separators resting thereon, from moving with their slides. Therefore, as the slide 34 returns to its initial position, the portion 37 thereof will then occupy the position in which the portion 36 is shown in Fig. 3, the slide moving from beneath the negative battery plate and the separator resting thereon, so that the plate and separator now are resting upon the portion 37 and at a location immediately in front of the separator magazine 47. Simultaneously, the slide 44 will have similarly positioned the positive battery plate and the separator thereon upon the advance portion of that slide and in a location in advance of the separator magazine 48.

The withdrawal of the portion 35 of the plate feeding slides from beneath the plate magazines, and the positioning of the surface or portion 36 of the slides beneath those magazines now conditions these slides for feeding a new battery plate from the magazines when the slides 34 and 44 are again advanced towards the platform 27. Therefore, when the slides 34 and 44 are again actuated towards the platform 27, the previously fed plates and separators, which are now upon the forward portions 37 of these slides, are positioned above the upper surface of the moving platform 27 in the manner indicated in Fig. 3. At the same time, the newly fed battery plates carried by the portions 36 by the plate feeders or slides 34 and 44 are disposed in front of the separator magazines 47 and 48 so that operation of the fluid pressure actuated mechanisms connected with the feeders or slides 50 and 54 feed a separator from the magazines 47 and 48, respectively, onto the newly fed battery plates.

When the plate feeders or slides 34 and 44 again return to their initial positions, the plates and separators upon the forward portions 37 of these slides are stripped therefrom by pivoted stripper members or dogs 60 and 61 which are identical with the members 58 and 59 and are rockably supported upon transversely extending members 62 and 63, respectively, adjacent the sides of the path of movement of the platform 27. Consequently, there will be deposited upon the platform 27, in superposed vertically stacked arrangement, a negative battery plate, a plate separator, a positive battery plate, and separator. The aforementioned return movement of the slides 34 and 44 will likewise result in stripping the plate and separator resting on the portions 36 of each of these slides so that these plates and separators are then disposed upon the portions 37 of the slides as heretofore described.

The aforementioned action continues with the depositing of a negative battery plate and separator, positive battery plate and separator upon the platform 27 at each complete reciprocation of the slides or feeding members 34 and 44 until sufficient plates and separators have been thus deposited to form a battery element of the required number of plates and separators except for the fact that the final negative plate has not yet been provided. The supplying of this completing negative plate for the element is effected by suppressing operation of the slide 50 on the stroke of the slides 34 and 44 in which the last complete group of plates and separators for the element are delivered to the platform 27. Consequently, the slide 34 will be provided with a negative plate on the portion 36 without the provision of a separator, thereon. This negative plate will then be disposed upon the portion 37 of the slide 34 upon the return movement of the slide while the positive slide 44 will have the forward portion thereof providing with both a plate and separator as during the normal operation.

Upon the next cycle, the slide 34 and the negative separator slide 59 act as usual to feed a plate and separator, while the actions of the positive slide 44 and of the separator slide 54 are suppressed. Therefore, when the slide 34 again returns to its initial position, a single negative plate will be delivered from the portion 37 onto the top of the plates and separators on the platform 27 thereby completing the element thereon. The plate and separator which have been fed onto the portion 36 of the negative slide or feeder 34 during this operation also dropped onto the portion 37 of the slide during this return movement as before described. Consequently, on the next cycle each of the slides will act in the normal manner to deliver to the platform 27 a negative battery plate with superposed separator, and a positive battery plate with superposed separator. In the interim the previously assembled element will have been removed from the platform 27 so that the latter is ready to receive the plates and separators for a new element which will be assembled as above described.

During this feeding or delivery of plates and separators to the platform 27, the latter will have been continuously moving downwardly under fluid pressure control as hereinafter described by virtue of the previously mentioned connection of the platform to the piston 28 in the cylinder 30. Moreover, the battery plates delivered to the platform 27 are repeatedly engaged adjacent the edges thereof to effect vertical alignment thereof. This latter action is achieved by two pairs of members 64, 65 and 66, 67, see Figs. 1 and 3, which are pivotally mounted in slots in the side walls of the supporting framework between which the platform 27 moves. Thus, as will be seen from Fig. 3, the members 64 and 65 each have a rearwardly extending portion connected to a vertical portion 68 the lower end of which is pivoted to a transversely extending shaft or rod 69 carried by the supporting frame apparatus. The members 66 and 67 are similarly constructed with a vertically extending portion 70 pivoted to a horizontally extending rod or shaft 71. The shafts or rods 69 and 71 are each provided with horizontally extending portions 72 and 73 which engage in overlapping arrangement and are maintained in engagement by a spring means 74 connected between extension portions of the vertical arms or members 68 and 70.

The spring means 74 acts to normally rock the portions or members 64, 65 and 66, 67 to a position inwardly of the side walls, between which the platform 27 moves, as indicated in broken lines at the left side of the platform in Fig. 3. However, when the plate feeding slides or members 34 and 44 move to their inwardmost positions, that is to the positions shown in Fig. 3, the bracket or member 38 on the slide 34 engages a part of the assembly including members 64 and 65, rocking the latter to their full line positions as shown in Fig. 3. Since the arm or portion 72 is engaged with the arm or portion 73, this movement of the members 64 and 65 also moves the members 66 and 67 to a corresponding position in which positions the members 64, 65, 66 and 67 engage the edges of the battery plates upon the platform 27 and effect vertical alignment thereof. The members 64, 65, 66 and 67 returning to their inoperative positions under the action of the spring means 74 when the slides 34 and 44 return to their initial positions as shown in Fig. 1.

When a completed element has been assembled upon the platform 27, and before the beginning of the assembling of a new element thereon, the previously assembled element is removed from the platform and the platform is returned to its initial or uppermost position. This removal of the assembled element is effected, as hereinafter described, in predetermined timed relationship with the operation of the plate and separator feeding slides and the movement of the platform 27, by means of a pusher plate or member 75 which is reciprocated by a fluid pressure operated mechanism comprising a piston reciprocating in a cylinder 76 and connected with the plate or member 75 by a piston rod 77. The pusher member 75 is adapted to move over the top surface of the platform 27 when the latter is in its lower position, the member 75 having a sufficient vertical extent to engage all the plates and separators of the element to thereby slide the element, as a unit, from the platform 27 and onto an intermittently operated conveyor 78 of the transfer mechanism T. When the pusher member 75 is returned to its initial position after thus delivering an assembled element to the conveyor 78, the platform 27 is elevated by the fluid pressure operated means connected thereto and the assembling of a new element is begun.

In the illustrated embodiment, the aforementioned fluid pressure operated means for actuating the assembling apparatus are controlled by suitable valves operated in timed relationship by a plurality of rotatable cams, the rotation of which is timed with respect to the other operations of the machine. Thus, with reference to Figs. 2 and 24A, it will be seen that a valve 79 controls the flow of fluid pressure to the cylinder 42, valve 80 controls the flow of fluid pressure to the cylinder 52, valve 81 controls the flow of fluid pressure to the element removing cylinder 76, valve 82 controls the flow of fluid pressure to the cylinder 30 for moving the platform 27, valve 83 controls the flow of fluid pressure to the cylinder 56 and valve 84 controls the flow of fluid pressure to the cylinder 46. These valves are similarly constructed and as shown in Fig. 5 each has the moving portion thereof contained in a housing 85 with an actuating member 86 extending externally of the housing with a spring 87 normally urging the valve to non-operated position.

The valve housings, such as 85, are each mounted on a longitudinal extending bar or support 88 which is rockably supported upon the frame of the assembling apparatus by connection to a shaft 89, the ends of which are rockably supported in suitable bearings on spaced standards or supports, such as 90 and 91, extending upwardly from the top portion of table-like portion 26 of the frame 25. The extent of rocking movement of the valve support or bar 88 is limited by one or more threaded stud members 92 connected with a stationary portion of the frame structure and extending through openings in the supporting member or bar 88 with motion limiting nuts 93 and 94 provided in spaced relationship on a threaded portion of the studs 92 on either side of the member 88.

Figure 5:
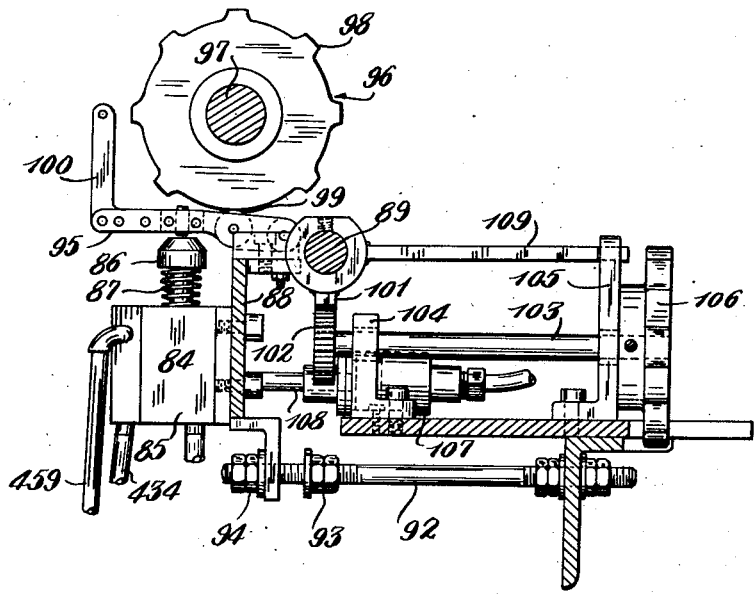
Fig. 5 is a sectional view taken substantially upon the section indicating line 5—5 of Fig. 4 and illustrating the manner in which the valves of the assembling station are operated.

Valve operating arms such as 95, are pivoted to the supporting member or bar 88 and extend above the operating member 86 of each of the valves for operation of the latter when the arms 85 are rocked in a counterclockwise direction, as viewed in Fig. 5. Rocking of the arms 95, and hence actuation of the valves 79 to 84, is effected in predetermined timed relationship by individual cams 96 mounted to rotate with a cam shaft 97 which is journalled on the supporting members 90 and 91 of the apparatus and extends parallel with, and adjacent to, the valve supporting member 88. The cams 96 are each provided with one or more projections or lobes 98 at spaced locations thereabout for engagement with a cam follower or roller 99 on the corresponding operating arm such as 95. It will be evident, therefore, that upon rotation of the cam shaft 97, the valves 79 to 84 will be operated in predetermined timed relationship and a predetermined number of times in accordance with the position and number of lobes 98. The valves may also be manually operated, if desired, as for example, during initial testing or set up of the machine, by simply manually rocking the arms 95. To facilitate operation in this manner, each of the arms 95 is provided with an upstanding extension portion 100.

The cams 96 are provided in a plurality of sets upon the cam shaft 97, there being a separate cam of each set adapted to cooperate with one of the valves 79 to 84 respectively. In the present embodiment four sets of cams are shown and consequently there are four cams adjacent each of the aforementioned valves for selective cooperation therewith, it being understood, however, that only one cam of each of the four for a given valve is employed at a given time. The several sets of cams are provided to adapt the machine for assembling battery elements having different numbers of plates and separators. Consequently, the adjacent cams for selective cooperation with the valves controlling the feeding of plates and separators will have different numbers of cam lobes in order that an element of corresponding size may be assembled, it being understood that a complete element is assembled for each revolution of the cam shaft 97.

Figure 4:
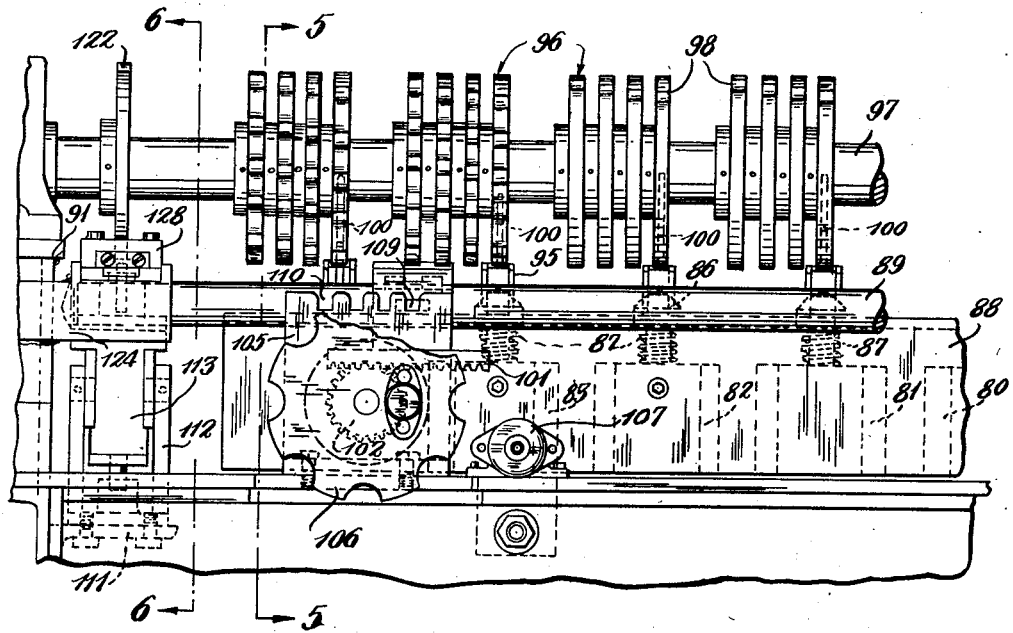
Fig. 4 is an enlarged, detached, rear elevational view of a portion of the control mechanism for the assembling station with parts broken away to facilitate illustration, the view being taken substantially on the line 4—4 of Fig. 1.

The several valves, 79 to 84, are selectively placed adjacent a given set of cams for cooperation therewith by longitudinal movement of the support 88 thereby simultaneously aligning the several cam operating arms 95 with the cams of the set thereof. This movement of the valve support member or bar 88 and the valves thereon is effected by a manually operated rack and pinion structure. Thus, as shown in Figs. 4 and 5, a toothed rack 101 is connected with the valve supporting bar or member 88 and is adapted to engage the teeth of a pinion 102. This pinion is connected to a short shaft 103 which is rotatably supported in suitable brackets 104 and 105 carried by the frame structure connected to the supporting members 90 and 91. The shaft 103 is connected to a manually rotatable knob or hand wheel 106 and hence rotation thereof effects longitudinal movement of the supporting member or bar 88 and the valves carried thereby to dispose the operating members 95 of the valves in cooperative relationship with the desired set of cams.

When the assembling station is inoperative the valve supporting bar or member 88 rocks by gravity from the position shown in Fig. 5 until it is stopped by the nuts 93 in which position the valve operating arms 95 are sufficiently beneath the cams 96 so that the lobes on the latter cannot effect valve operation. In this position, however, the rack 101 remains in engagement with pinion 102, the teeth of the rack 101 being transversely curved sufficiently to permit this movement. Hence, the aforementioned longitudinal adjustment of the bar or member 88, and of the valves thereon, relative to the cam shaft 97 may be effected by rotating the knob 106.

After the valves are thus adjusted and the machine is placed in operation, fluid pressure is supplied, as hereinafter described, to one or more cylinders 107 carried by the stationary portion of the supporting structure and adjacent the downwardly extending portion of the bar or member 88 with the result that a reciprocating plunger or rod 108 moves outwardly of each cylinder such as 107 engaging member 88 and rocking the latter, with the valves, to the operative position as shown in Fig. 5. In this position of the parts, an arm 109 connected with the support or bar 88 in the region of the rack 101 engages in one of a plurality of notches 110 provided in the upper edge of bracket 105 and spaced in accordance with the spacing of corresponding cams in the several sets thereof. This engagement of arm 109 in one of the notches 110 prevents shifting of the parts during operation of the machine as well as serving as a positive means to insure proper alignment of the valves with the several cams.

The support 91 is provided with an angle bracket 111, see Figs. 2 and 6, on the upper surface of which is secured a U-shaped member 112 with the legs of the U directed upwardly. A valve 113 has the housing thereof rockably supported between the legs of the U-shaped member 112 by suitable pivot pins 114. The lower portion of the housing of the valve 113 has a somewhat arcuate surface in which are provided a pair of spaced recesses 115 and 116 for selective cooperation with a spring pressed ball detent 117 which is disposed vertically upon the bight of the U-shaped member 112 and acts upwardly. Extending forwardly from the valve 113 is a handle 118 provided with a knob or like expedient 119 to facilitate manual actuation of the valve from one position, in which the ball detent 117 is engaged in the recess 116, to the position in which the detent is engaged in the recess 115 as shown in Fig. 6.

The valve 113 is adapted to control the flow of fluid under pressure from a source thereof to the cylinder or cylinders 107 which, it will be remembered, operate to rock the valves of the assembling apparatus into co-operation with the cams 96. The valve 113 has its sliding valve actuating member provided with a cam follower or roller 120 which is adapted to be engaged by a cam surface or lobe 121 on a cam 122 carried by the cam shaft 97 when the valve is in the position shown in Fig. 6. When thus actuated, the valve 113 supplies fluid pressure to the cylinder or cylinders 107 moving the bar member 88 to place the several valves 79 to 84 in position for operation by the cams 96 in timed sequence as the cam shaft 97 is rotated. There is but a single cam lobe 121 on the cam 122 and it is so positioned that the valve 113 is operated thereby and effects rocking of the valve supporting member 88 at a period during the rotation of the cam shaft 97 such that the several cams 96 will always be located to begin assembling a new element.

It will be apparent from the construction thus far described that the assembling station will continue to operate so long as the valve 113 remains operated since it controls the supply of fluid under pressure to the valve support 88 thereby holding the latter in the position wherein the several valves thereon are sequentially operated by the cooperating cams. However, it will also be noted that the single lobe 121 on the cam 122 is effective to operate valve 113 for only a portion of a cycle of rotation of the cam shaft 97. Consequentially, a means is provided to maintain the valve 113 in operated position once it has been actuated by the cam 122 and until the valve 113 is rocked to its inoperative position by the operator exerting force upon the handle 118.

This means for holding the valve 113 in operative position is shown in Figs. 6 and 7 of the drawings as comprising a plate-like member or slide 123 which is supported for horizontal sliding movement upon a suitable bracket or support 124 connected to the adjacent vertical support 91 of the frame. The plate-like member or slide 123 has its forward end bifurcated to provide two spaced portions which are adapted to pass on either side of the cam follower or roller 120 and rest upon the upper surface of the movable portion 125 of the valve when the valve has been actuated to its operated position. The member 123 is continuously urged into the position just mentioned by a compression spring, or the like, 126 which acts between the stationary portion of the mounting for the slide 123 and a lug or the like 127 carried thereon, the spring 126 and slide 123 being preferably enclosed in a housing 128 connected to the support 124. The corners of the plate-like member 123, adjacent the slot in which the roller 120 is received, are removed and the upper surface of the member 125 is beveled as will be apparent from Figs. 6 and 7.

When the valve 113 is in its inoperative position, namely with the detent 117 engaged in the recess 116, the slide 123 will be in the forward position but the valve member 125 will extend above the housing 128 and will be located forwardly of the leading edge of the slide 123. As the operator rocks the valve 113 to the operative position, by means of the handle 118, the member 125 engages the forward edges of the slide 123 and moves the latter backwardly against the force of the spring 126 since the relieved corners of the slide will be engaged with the sides of the valve member 125. The operator holds the valve 113 in this position until the rotation of cam 122 brings the lobe 121 into engagement with the cam roller or follower 120 whereupon the latter, and the valve member 125, will be moved downwardly within the valve housing to the operative position, which is the position shown in Fig. 6. In this position the slide 123 is freed and moves over the top of the valve member 125 under the influence of spring 126. Therefore, when the lobe 121 moves past the cam roller 120, the slide 123 holds the valve member 125 in its operated position with the result that the assembling station will continue to operate, without interruption, to repeatedly effect assembling of elements of battery plates and separators.

When it is desired to terminate operation of the assembling station, it is simply necessary for the operator to grasp the handle 118 and rock the valve 113 clockwise as viewed in Fig. 6, thus removing the valve member 125 from beneath the slide 123 so that the valve member 125 returns to its inoperative position. This, in turn, terminates the supply of fluid pressure to the cylinders 107 with the result that the valve supporting member 88 rocks to its inoperative position in which position the valves 79 to 84 are no longer operated by the cams 96.

As mentioned heretofore, the movable platform 27 is lowered as an element is assembled thereon and, after the element has been completed, the member 75 is operated by the valve 81 to remove the assembled element from the platform 27 and place it upon the conveyor 78. Thereafter the valve 82 is operated to supply fluid pressure to the cylinder 30 thereby returning the platform 27 to its uppermost position after which the valves 79, 80, 83 and 84 are again operated in timed relationship to deliver battery plates and separators onto the platform 27, thereby assembling a new element. This newly assembled element will be delivered to the conveyor 78 in like manner, the conveyor having moved in the interim to dispose a vacant portion thereof with alignment to the platform 27.

*Transfer station*

The conveyor 78 forms a part of a transfer mechanism or station by which the assembled elements are transferred from the assembling machine to a station where the lugs of the battery plates are fused or burned to plate connecting straps. This burning station, as will be hereinafter described in detail, operates on the battery elements with the latter positioned so that the plates and separators thereof extend vertically. It will be remembered, however, that the assembled elements are delivered from the assembling station to the conveyor 78 and are carried by the latter with the plates and separators of the elements extending horizontally. Consequentially, the transfer station includes means for removing assembled battery elements from the conveyor 78 and for rocking or tilting the assembled elements through an arc of substantially 90° to thereby position the element for reception by the burning apparatus, the transfer apparatus also including a means to move the assembled and rocked elements from the transfer apparatus to the burning machine.

The conveyor 78, in the preferred embodiment, is formed by a pair of sprocket-like chains 129 and 130, the links of which are provided with spaced, transversely extending members 131 formed of bars of wood or the like. The dimensions and spacing of the bars 131 are such that a battery element E can be received thereon with the plates and separators extending horizontally and contained between spaced vertical plates, such as 132 and 133, supported upon the sides of spaced ones of the bars 131 as will be seen in Fig. 8. The chains 129 and 130 travel over suitable sprockets 134 and 135 which are supported in a conventional manner by frame members, the details of which need not be described.

The conveyor 78 is adapted to be intermittently operated in timed relationship with the operation of the assembling station and, in the preferred embodiment, this is effected by a fluid pressure operated mechanism controlled by the cam shaft 97 of the assembling station.

This fluid pressure operated mechanism comprises a cylinder 136, stationarily supported between the top and lower flights of the chains 129 and 130, and provided with a piston 137 which is connected by a piston rod 138 to a transversely extending movable member or cross-head 139. The member or cross-head 139 is, in turn, connected to a guide rod 140 which slidably extends through a transversely disposed bracket or support 141 of the frame of the machine and provides a means for insuring straight line reciprocation of the cross-head 139. The lower portion of the cross-head 139 has a transversely extending rod or shaft 142 rockably supported therein. The rod or shaft 142 is provided with spaced fingers or dogs 143 and 144, see Fig. 9, which are positioned to engage the pins of chains 129 and 130, the lower ends of the fingers or dogs 143 and 144 being notched for cooperation with the said pins.

Figure 8:
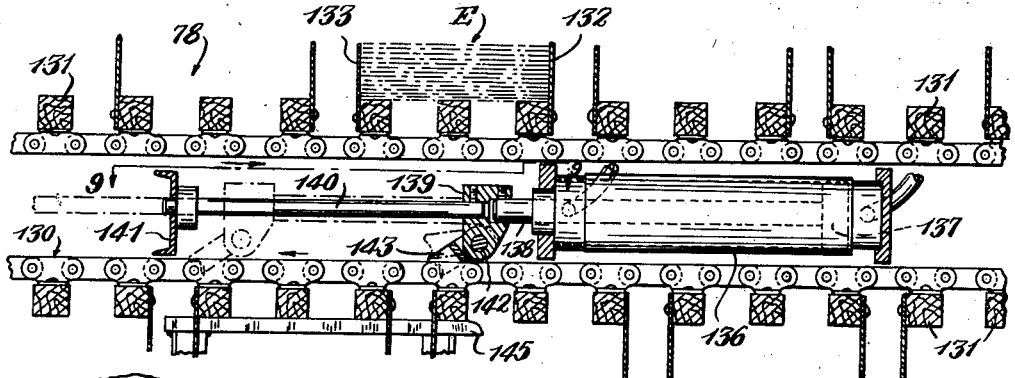
Fig. 8 (Sheet 5) is an enlarged, fragmentary, sectional view, taken substantially on the section indicating line 8—8 of Fig. 1, illustrating the intermittently moving conveyor of the element transfer station with a battery element thereon.

The construction is such that when fluid pressure is supplied to the rear of the cylinder 136, the piston 137 moves outwardly, that is, to the left as viewed in Fig. 8, so that the cross-head 139 and dogs 143, 144 are moved from their full line positions, as shown in Fig. 8, to the left and to the position as indicated in broken lines in that figure. Since the dogs 143 and 144 are in engagement with pins of the chains 129 and 130, this movement exerts a thrust on the lower flights of the chains in the direction indicated by the arrow in Fig. 8 thereby moving the top flights of the chains, carrying the assembled battery elements to the right as viewed in that figure. The thrust thus exerted by the fluid pressure operated means is constrained to produce a forward movement of the conveyor by virtue of a pair of spaced guide members or supports, 145 and 146, which are mounted upon the frame for the conveyor beneath the lower flight thereof and are positioned for providing a sliding support of the transverse members or blocks 131 in the region of operation of the cross-head 139 and dogs 143, 144. When fluid pressure is supplied to the other side of the cylinder 136, the piston 137 and cross-head 139 are returned to their initial positions during which movement the dogs 143, 144 are returned from the position indicated in broken lines in Fig. 8 to the position shown in full lines therein and during this movement the dogs latch idly over the pins of the chains 129 and 130.

As mentioned heretofore, movement of the conveyor 78 is under control of the cam shaft 97. This is effected by providing the cam shaft 97 with a rotatable cam 147 which is positioned to engage and actuate a cam follower 148 connected with the movable member of a fluid pressure controlling valve 149, the valve being supported by a suitable plate or bracket 150 connected to the support or standard 91 of the assembling apparatus. The manner in which the valve 149 is connected to control the flow of fluid pressure to the conveyor actuating cylinder 136 will hereinafter be more fully explained in conjunction with the other fluid pressure connections for the machine as illustrated in Figs. 24A and 24B. It is sufficient for the present, however, to note that cam 147, being rotated by the cam shaft 97, controls the supply of fluid pressure to the opposite ends of the cylinder 136 in timed relationship with the delivery of each assembled element from the platform 27 to the conveyor 78 so that the conveyor is moved intermittently a distance sufficient to carry an assembled element, delivered thereto by the member 75, from alignment with the platform 27, and the next pair of plates 132 and 133 of the conveyor are moved into alignment with the platform 27 to receive the next assembled element.

The mechanism by which the assembled elements are removed from the conveyor 78 and are delivered to the burning station B is illustrated in Figs. 1 and 10 to 13 as comprising a support or carriage 151 which is mounted for horizontal reciprocation upon a pair of spaced guide rods 152 and 153. These guide rods are carried in part by the supporting frame of the conveyor 78 and in part by a supporting structure or framework connected thereto and to other stationary parts of the machine, the guide rods 152 being positioned so as to extend transversely relative to the conveyor 78 from one side thereof to a position adjacent a portion of the periphery of a rotatable table or support 154 of the burning apparatus B.

The carriage 151 is reciprocated upon the guide rods 152 and 153 in timed relationship with the movement of the conveyor 78 by a fluid pressure operated mechanism connected with the carriage and actuated in response to movement of the conveyor. Thus, a cylinder 155, which is connected with a stationary portion of the frame, has a piston 156 slidable therein in response to alternate application of fluid under pressure to the opposite ends of the cylinder. The piston 156 is connected to a piston rod 157, which extends externally of the cylinder, and is in turn connected with a depending lug or bracket secured to the carriage 151. Control of the supplying of fluid under pressure to the cylinder 155, and hence movement of carriage 151, is provided by a pair of valves 158 and 159 located in spaced relationship adjacent the path of movement of the cross-head 139 of the conveyor 78.

Figure 9:
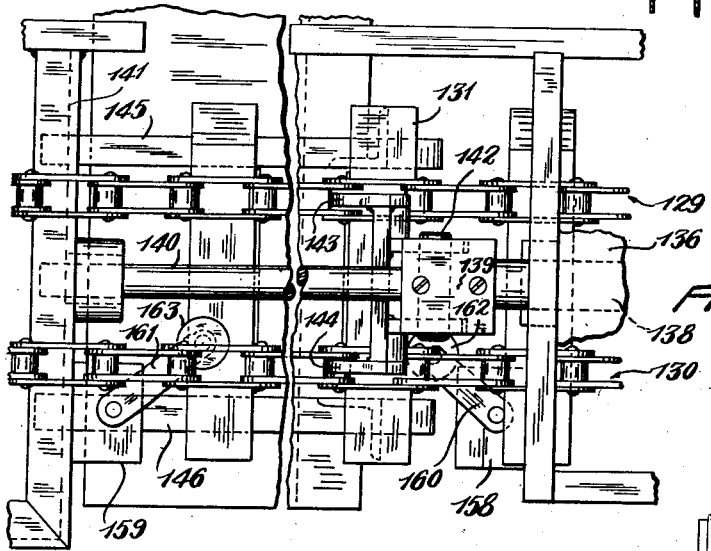
Fig. 9 is an enlarged, fragmentary, top plan view of a portion of the intermittently moving conveyor, the view being taken substantially in the region designated 9—9 in Fig. 8.

The valves 158 and 159 are each provided with a rocking actuating arm 160, 161, respectively, the outer end of each of which is provided with a roller 162, 163, respectively. As shown in Fig. 9, the cross-head 139 is in engagement with the roller 162 when the piston rod 138 of the conveyor moving mechanism is at the one position thereof. Consequentially, the valve 158 is operated and supplies fluid under pressure, as will be hereinafter described, to one end of the cylinder 155 for moving the carriage 151 to one of its two positions. When the cross-head 139 moves from the position shown in Figs. 8 and 9 thereby moving the conveyor 78 the cross-head 139 will move from engagement with the roller 162 and will engage the roller 163 at the end of the movement of the cross-head in this direction thereby supplying fluid under pressure to the other end of the cylinder 155 so that the latter and the carriage 151 return to their initial positions. It will be apparent therefore that each time the conveyor 78 is actuated, the carriage 151 will be correspondingly actuated and, since the conveyor 78 is controlled in its movement by the assembling apparatus, it will be evident that the carriage 151 of the transfer mechanism also is actuated in timed relationship with operation of the assembling station.

The carriage 151 is provided with a pair of cooperating members or jaws 164 and 165 which are adapted to engage on either side of a battery element E and grip the latter with sufficient force to prevent shifting of the plates and separators while the element is being transferred from the conveyor 78 to the table 154 of the burning machine. Therefore, the jaw members 164 and 165 are movable relative to each other. In the illustrated embodiment, the jaw member 164 is fixably mounted upon a supporting member or members 166 while the jaw member 165 is slidable towards and from the jaw member 164. As shown in Fig. 10, the jaw member 165 has a pair of guide rods 167 and 168 connected thereto and slidable through cylindrical bearings or bosses 169 and 170 mounted upon the support 166. Intermediate the jaw member 165 and the bearings 169 and 170, the guide rods 167 and 168 are each provided with a compression spring 171 and 172, respectively, so that the jaw member 165 is normally urged towards the jaw member 164. The jaw member 165 is, however, movable away from the jaw member 164 against the force of the springs 171 and 172 by a fluid pressure operated mechanism 173 which comprises a piston in a cylinder. The cylinder of the mechanism 173 is secured to the supporting member 166 and the piston thereof is provided with a piston rod 174 connected to a transversely extended member or bar 174a which is secured to the outer ends of the guide members 167 and 168.

Control of the supply of fluid under pressure to the fluid pressure operated means 173 is effected by a valve 175 which is secured to a portion of the supporting frame for the transfer mechanism and is operated by movement of the carriage 151. One form of a suitable valve for this purpose is shown in Fig. 12 from which it will be seen that the valve operating member is in the form of a rod or button 176 normally extending upwardly from the valve 175 when the supply of fluid pressure therethrough is interrupted. The valve housing is provided with a pivoted arm 177 extending over the rod or button 176 and adapted to actuate the latter when the arm 177 is depressed. The arm 177 has an opening intermediate the ends thereof in which is pivoted an operating dog or pawl 178, the pawl being normally urged to a position substantially as shown in Fig. 12 by suitable spring means, not shown. Hence, the pawl is free to rock clockwise as viewed in the position of Fig. 12 without effecting rocking of the arm 177. Rocking movement of the pawl 178 in the opposite direction is, however, limited by engagement thereof with the edge of the opening in the arm 177 in which the pawl is pivoted.

It will be evident, therefore, that when the carriage 151 moves forwardly a projecting portion or bracket such as 179 thereon, which is positioned for movement above the arm 177, will engage the pawl 178. This movement of the carriage towards the conveyor 78 is to the left, as viewed in Fig. 12, and hence the arm 177 will be rocked thereby operating the valve 175 to supply fluid under pressure, as hereinafter described in greater detail, to the fluid pressure operated mechanism 173. Hence, the piston rod 174 is moved outwardly thereby retracting the jaw member 165 against the force of the springs 171 and 172. This actuation of the valve 175 is prior to movement of the jaws 164 and 165 on either side of the battery element E on the conveyor 78 and at this time it will be understood that the jaws are tilted to the position shown in full lines in Fig. 13. However, by the time the jaw members 164 and 165 have reached the position on either side of the battery element, the valve operating arm or bracket 177 on the carriage 151 will have passed over the pawl or dog 178 so that valve operating arm 177 returns to its upper position terminating the supply of fluid under pressure to the mechanism 173 with the result that the springs 171 and 172 move the jaw member 165 into firm engagement with the battery element on the conveyor. Upon reverse movement of the carriage 151, the valve 175 is not operated since the pawl 178 can pivot freely in this direction of movement without rocking the arm 177. Therefore, the jaws 164 and 165 firmly hold the battery element therebetween during movement of the carriage from the vicinity of the conveyor 78.

As mentioned heretofore, the jaw members 164 and 165 are pivotally supported upon the carriage 151. This is effected by having a suitable bracket means secured to the support 166 for the jaw members and connected to rod or shaft 180 which is rockable in suitable bearings provided on the carriage 151. The shaft 180 is tilted by fluid pressure operated mechanism comprising a cylinder 181 having a piston 182 reciprocable therein and connected by a piston rod 183 to a link 184 which, in turn, is connected at its other end to the shaft 180 for effecting rocking thereof. The cylinder 181 is pivotally supported adjacent its inner end to a bracket 185 depending from the lower side of the carriage 151 and the piston rod 183 is pivoted at its outer end to the link 184. It will be evident therefore that when fluid pressure is supplied to one end of the cylinder 181 as, for example, to the forward end thereof, the piston 182 will be moved to a position substantially as shown in full lines in Fig. 13 thereby pulling the link 184 to the position shown in full lines in Fig. 13 so that the jaw members 164 and 165 are rocked to their positions for engaging an element on the conveyor. When fluid pressure is supplied to the other end of the cylinder 181, however, the piston 182 moves to its other position in the cylinder, thereby rocking the link 184 to the position as shown in broken lines in Fig. 13 and thereby rocking the jaws 164 and 165 to their vertical positions shown in broken lines in Fig. 13, the cylinder 181 also rocking slightly as indicated in that figure. If an element be positioned between the jaws 164, 165 when the latter are rocked as just mentioned, it will be evident that the element will likewise be rocked to a position in which the plates and separators thereof extend substantially vertically since the jaw members have rocked through an arc of 90°.

The fluid pressure for tilting or rocking action of the jaw members 164 and 165 to their horizontal positions is under control of a valve means 186. This valve means is constructed in the same manner as valve 175 and is provided with a similar rocking arm 187 having a pivoted pawl similar to the pawl 178 for, the valve 175, the arm 187 being located for actuation by a bracket or plate member 188 carried by the carriage or slide 151. The valve member 186 is located a greater distance from the conveyor 78 than is the valve 175 so that the jaw members 164 and 165 can be tilted to their horizontal positions prior to the time they begin to move on the opposite sides of a battery element E on the conveyor 78, the jaw member 165 being separated from the jaw member 164 after the members have been tilted and before the members begin to move on either side of the battery element. The jaw members 164 and 165 remain in the position to which they have been tilted through actuation of the valve 186 even after the said valve has been released by passage of the plate or bracket 188 thereover. Moreover, return of the bracket or plate 188 over the valve 186 on the reverse movement of the carriage 151 does not again operate the valve 186 since, as noted above, the valve arm 187 is provided with a pawl similar to the pawl 178 so that return movement of the carriage or slide does not rock the valve arm 187.

During the return movement of the carriage 151, however, the jaw members 164 and 165 are rocked, with the battery element E therebetween, back to the initial position in which the members and element extend vertically. This is effected by supplying fluid under pressure to the other end of cylinder 181 in response to actuation of a valve 189 by movement of the carriage 151 in the direction away from the conveyor 78. The valve 189 is constructed similar to the valve 175 and has a rocking arm 190, see Fig. 11, for actuation of its valve operating member 191. However, the arm 190 differs from the arm 177 of the valve 175 since the pawl 192 pivoted to the arm 190 is operative in the opposite direction from that of the pawl 178. Thus, the pawl 192 is normally held in the position indicated in Fig. 11 by a suitable spring, not shown, but can rock freely in a counterclockwise direction, as viewed in that figure, without operation of the arm 190. Rocking of the pawl 192 in the opposite or clockwise direction, however, is limited by the side of the slot or opening in arm 190 in which the pawl is mounted so that when the pawl is engaged and rocked by movement of the carriage 151 in this direction, the arm 190 is rocked thereby operating the valve 189.

The valve 189 is so mounted that movement of the carriage or slide 151 in the direction towards the conveyor 78 in the direction as indicated by the arrow pointing to the left in Fig. 11 and hence the valve 189 is not operated during movement of the jaw members 164 and 165 into engagement with a battery element E on the conveyor 78. However, when the carriage 151 begins its return movement from the conveyor, a projecting portion or member on the carriage engages the pawl 192 and thereby operates the valve 189 so that fluid under pressure is supplied to the cylinder 181 in the direction tilting the jaw members and the battery element therebetween to the vertical position. After the carriage has passed over the pawl 192, the supply of fluid pressure to the cylinder 181 is terminated but the jaw members will remain in their positions, due to gravity, until forward movement of the carriage 151 again effects operation of the valve 186 thereby supplying fluid pressure to the cylinder 181 in the direction to tilt the jaws to their horizontal positions.

Adjacent the conveyor 78, at a location opposite the position occupied by the jaw members 164 and 165 when the latter are engaging a battery element E on the conveyor, is mounted a fluid pressure operated mechanism which assists in positioning a battery element between the jaws and also acts to partially tilt the said jaws so that the element may be withdrawn from the conveyor without dragging on the top thereof. This fluid pressure operated mechanism comprises a cylinder 193 secured to a suitable bracket 194 that is connected to a supporting and guard member 195 of the conveyor mechanism. The piston within the cylinder 193 is connected, by means of a piston rod 196, with a reciprocating member 197 which is adapted to move into engagement with the edges of a battery element resting upon the conveyor 78, and exert a thrust thereon when fluid under pressure is introduced into the cylinder 193 thereby insuring that the battery element will be firmly seated between the jaw members 164 and 165. This seating of the element between the jaw members by the fluid pressure actuated member 197 also acts to tilt the element and jaw members slightly since the pivot for the jaw members is disposed at one side of the center of gravity thereof as will be apparent from Fig. 13. Hence, when the carriage 151 is moved away from the conveyor 78, the lower battery plate of the element E between the jaws 164, 165 will not drag upon the blocks 131 of the conveyor. The tilting of the jaw members under action of the piston 182 in cylinder 181 in response to the rearward movement of the carriage 151 occurs shortly after the tilting impulse exerted by the member 197 so that this impulse is substantially a part of the return rocking of the jaws as described above.

The supplying of fluid under pressure to the cylinder 193 is controlled in timed relationship with reciprocation of the carriage 151 by means of a valve 198, similar to the valve 175, which is positioned for actuation by a plate or bracket 199 mounted on the carriage 151. The valve 198 has an operating arm similar to that for the valve 175 and is actuated in a similar manner, the valve being positioned so that it is operated when the carriage substantially reaches its location of closest approach to the conveyor 78.

It will be seen, with reference to Fig. 13, that the jaw members 164 and 165 are each preferably provided with an offset or recess 200 and 201, respectively, intermediate their ends. These offsets or recesses are provided to enable a member to move therethrough for engagement with a battery element held therebetween and thereby transfer the element from the jaws 164 and 165 to the table 154 of the burning apparatus B. The member 202 which thus engages a battery element is connected at the outer end of a piston rod 203 which is operated by a piston 204 slidable within a cylinder 205. The cylinder 205 is mounted upon the sliding carriage 151 for movement therewith, the cylinder having its axis extending transversely of the path of movement of the carriage.

The member 202 is adapted to pass freely through the recesses or openings 200, 201 in the jaw members 164, 165 when the jaw members are firmly holding a battery element and are disposed so that they extend substantially vertically. Therefore, the movement of the carriage 151 and tilting of the jaw members are rapidly effected so that the jaw members have reached this position and are located the maximum distance from the conveyor 78, before the member 202 is moved, the said movement being timed to effect transfer of the element from between the jaw members onto the burning table or support 154 at a predetermined location thereon. This timed relationship of the operation of the member 202 relative to movement of the table 154 is effected by a fluid pressure controlling valve 206 which is suitably mounted upon the support for the transfer station T in a position in which its actuation is controlled by the rotation of the burning apparatus.

As shown in Fig. 10, the valve 206 has an operating arm 207 rockably supported on the valve housing, this arm having a roller 208 on its outer end which extends adjacent the periphery of the rotatable burning table or support 154 for sequential actuation by spaced cams 209 carried thereon. Consequently, as the burning table 154 rotates, as hereinafter described, a cam 209 thereon will engage the roller 208 thereby operating the valve 206 to supply fluid pressure to the cylinder 205. At this time the carriage 151 will be in the rearwardmost position with the cylinder 205 located as indicated in the broken lines in Fig. 10. Therefore, the fluid pressure thus supplied to the cylinder 205 causes the member 202 to pass through the recesses or openings in the jaws 164 and 165 thus engaging the battery element E therebetween and moving the latter onto the adjacent portion of the rotating table 154 of the burning apparatus B where the element is clamped and supported as hereinafter described. Rotation of the member 202 is prevented by a suitable rod or guide member 210 connected therewith and extending through a stationary portion of the cylinder housing so that the member 202 can reciprocate through the jaw members without interference therewith.

The rotating table or support 154 of the burning station B is driven, as hereinafter described, in timed relationship with the rotation of the cam shaft 97 which controls the assembling station and the transfer station T. Hence, each time a cam 209 of the burning station actuates the valve 206 of the transfer mechanism T a battery element will have been positioned for engagement by the member 202 and transfer thereby to the burning table. After each operation of the valve 206 by a cam 209, the transfer mechanism T will sequentially move the carriage 151 thereof towards the conveyor 78, tilt the jaws and engage them with a battery element on the conveyor 78, actuate the cylinder 193 to assist in positioning the element between the jaws, tilt the jaws back to their initial positions, and move the carriage back into the element transferring location which it reaches slightly before the next successive cam 209 engages the valve.

*Burning station*

The station in which the battery elements have connecting straps fused or burned to the plate lugs, and which has been heretofore referred to as including a rotatable table 154, is illustrated in Figs. 14 to 21 of the drawings. Referring first to Fig. 20, it will be seen that this portion of the machine comprises a suitable supporting frame 211 formed of plates and/or structural steel members welded or otherwise secured together and having a substantially horizontally extending supporting surface 212 upon which is provided a vertically extending cylindrical portion 213 having bearings for rotatable mounting the aforementioned table or support 154. The table or support 154 has a depending flange of generally cylindrical configuration upon which the previously mentioned cams 209 are mounted in circumferentially spaced relationship there being one cam member 209 for each element supporting means carried by the table which, in the present embodiment, are nine in number.

The lower portion of the frame 211, beneath the table 154, is provided with a bull gear 214 which is driven by a spur gear 215 that is in continuous mesh therewith. The gear 215 is in turn driven from a suitable source of power such an electric motor or the like, not shown, connected by a belt 216 to the input pulley of a variable speed mechanism 217, the output shaft of which is connected with the aforementioned spur gear 215. Consequently, when the motor or other power source for driving the belt 216 is energized, the burning table 154 is rotated thereby operating the transfer mechanism sequentially as has been previously mentioned.

The battery element supporting and clamping means are spaced equal arcuate distances about the top surface of the rotatable burning table 154. Each of these element supporting and clamping means comprises a stationary vertically extending wall member 218 which is secured to the top of the table and has the inner surface thereof extending generally radially of the table. Adjacent the inner edge of the wall 218 and extending at substantially right angles thereto is a second vertically extending stationary wall or abutment member 218a forming the rear wall of the element supporting means. The movable portion of the element supporting and clamping means is a movable wall member 219 which extends substantially parallel with the stationary wall member 218 and is movable towards and away from the latter to effect clamping of a battery element therebetween.

The wall member 219 of each element supporting and clamping means is provided with a horizontally extending portion 220 to the underside of which are secured substantially L-shaped members 221 and 222, see Fig. 17, with the members extending substantially parallel with each of the other in back-to-back relationship but spaced apart sufficiently to receive therebetween the upper arm 223 of a bell-crank lever 224. The arm 223 is slotted adjacent its upper end, see Fig. 18, and provided with a suitable bearing 225 for rocking engagement about a pin 226 which is carried by the members 221 and 222. The horizontally extending portions of the members 221 and 222 each extend beneath the overhanging portions of complementary shaped guide members 227 and 228 which are secured to the table 154 and provide a sliding guideway for the members 221 and 222 in a direction perpendicular to the wall 219, the interfitting surfaces of the guide members 221, 227 and 222, 228 preventing tilting of the wall 219 in this sliding movement.

The bell-crank lever 224 is pivoted at 229 to a depending bracket 230 secured to the lower side of the table 154 and the bell-crank lever is normally urged in the direction that moves the wall 219 towards the wall 218, that is counter-clockwise as viewed in Figs. 18 and 19, by a spring 231 secured to the arm 223 and to a stationary support on the lower portion of the table 154. The bell-crank lever 224 is adapted to be rocked in the opposite direction, and thereby move the wall 219 away from the wall 218, by a cam surface with which a cam roller 232 on the lower arm 233 of the bell-crank lever engages during rotation of the table.

The cam surface with which the roller 232 of the bell-crank lever 224 engages is provided on an arcuately disposed cam member 234 which is secured to the top of the support 212. The upper surface of the cam member 234 is planar and sufficiently high so that when the cam roller 232 is moving thereover, during rotation of the table 154, the wall 219 is actuated sufficiently far from the wall 218 to permit reception therebetween of a battery element having the maximum dimensions which is to be handled by the apparatus. This planar upper surface of the cam member 234 extends past the location where the battery elements E are transferred from the station T so that the wall 219 is maintained far enough from the wall 218 to permit ready introduction of an element therebetween. That is to say, as the table 154 rotates to a position where a cam 209 causes the member 202 to transfer a battery element from between the jaws 164, 165, the burning table 154 will be positioned with one of its clamping and supporting means aligned for radial reception of the element.

As the burning table 154 continues to rotate and shortly after the battery element E has been transferred thereto, the cam roller 232 moves down an inclined surface 235 of the cam member 234 to a second substantially horizontal surface 236, see Fig. 19. This drop of the lower arm 233 of the bell-crank lever permits the spring 231 to move the wall 219 into engagement with the battery element E located between the walls 218 and 219 with sufficient force to support the element without, however, exerting a tight clamping grip thereon with the result that there can be slight relative movement between the plates and separators in directions parallel therewith. The extent of the clamping action at this time can be adjusted for an element of any given size by adjusting the height of the surface 236 and for this purpose, the surface 236 is provided upon a substantially bar-like member 237 which is supported at spaced points by vertically extending screws 238 and 239 threaded through tapped openings of the support 212, or of a part 240 secured thereto. The screws 238 and 239 can be simultaneously turned for adjusting the elevation of the member 237 by providing each of the screws with a sprocket 241, 242, respectively, about which is trained a chain 243, one of the screws being further provided with a hand wheel or the like 244 by which it may be manually turned thereby causing corresponding turning of the other screw member through the interconnection provided by the chain and sprockets.

The inclined surface 235 of the cam 234 is preferably vertically slotted with the adjacent end of the member 237 received therein so that the cam rollers 232 can smoothly pass from the one cam surface to the other. The member 237 has a second horizontal cam surface 245 thereon at a lower elevation than the surface 236 and at a height such that, when the cam roller 232 moves thereon, the wall 219 will have been actuated towards the wall 218 sufficiently far to firmly grip the plates and separators and prevent relative shifting thereon. Alternatively to providing two horizontal surfaces of different elevations upon the member 237, the latter may be made sufficiently short so that it terminates at the end of the surface 236 so that, as the cam rollers 232 pass from this surface, they can freely drop with the result that the springs 231 exert full clamping force upon the battery elements between the walls 218 and 219.

In any event, whether the member 237 has one or two horizontal surfaces, the bell-crank levers, when they pass therebeyond, exert the aforementioned full clamping force of the spring 231. Therefore, the battery elements are firmly held from a time shortly after they are received from the transfer mechanism and while they pass beneath the burning head, the clamping force being released only when the completed elements have reached a location at which they are to be removed from the burning table. Adjacent this latter location, the cam 234 is provided with an inclined surface 246, see Fig. 20, up which the cam roller 232 rides to thereby move the element wall 219 to spaced relationship relative to the wall 218 for release of an element as will be readily apparent from the showing in Fig. 18.

The burning station B is provided with a mechanism for aligning the battery plates with each other and for moving the vertical edges of the battery separators inwardly relative to the vertical edges of the battery plates in the event they have not thus been previously so positioned during the assembling operation or have moved therefrom during the transfer operations. For this purpose, the support 212 is provided with a vertically extending bracket 247 adjacent the location at which the battery elements are transferred to the burning station and slightly therebeyond as viewed in the direction of rotation of the burning table, see Fig. 1. The bracket member 247 is provided at the upper end thereof with a bearing 248 for a vertically extending shaft 249, the upper portion of which carries the plate and separator edge aligning means, generally designated 250. As shown in Fig. 16, this means comprises a cylindrical portion 251 keyed to the shaft 249 for rotation therewith and a disc-like portion or wheel 252 which is of larger diameter than the cylindrical portion 251 and is also connected to rotate with the shaft 249. The disc 252 and the cylindrical portion 251 may be made integral, if desired, but preferably these parts are separate, thereby facilitating changing thereof for cooperation with battery elements having plates and separators of different dimensions.

The cylindrical portion 251 of the aligning means is provided with alternate grooves 253 and lands 254 extending axially of the member. The grooves 253 have a width sufficient to accommodate therein the edges of the battery plates while the lands 254 are adapted to engage the edges of the battery plate separators with the height of the lands corresponding to the distance which the edges of the separators should be disposed inwardly of the adjacent edges of the battery plates. The arcuate distance between the grooves 253 is such that they receive sequentially the plates of a battery element presented thereto in the manner in which a rack engages the pinion. The disc 252 has a radius such that its periphery engages the plate lugs PL of the battery element E and assists in properly locating the plates within the element clamping units provided by the walls 218, 218a and 219.

It will be apparent from the construction just described that a battery element E supplied from the transfer mechanism T is received in the clamping means provided by the walls 218, 218a and 219 and that this element will be held loosely in proper position shortly after its delivery to the burning apparatus by virtue of the cam roller 232 moving from the top of the cam 234 downwardly onto the cam surface 236. At this time, however, the battery plates and separators of the element E may be shifted slightly to secure the proper alignment of the several parts thereof. Hence, as the element is thus held and moved past the mechanism 250 the disc portion 252 thereof will engage the plate lugs while the cylindrical portion 251 will have the grooves 253 and lands 254 engaged with the edges of the plates and separators of the element and, as the burning table 154 rotates, the mechanism 250 correspondingly rotates thereby properly aligning the plates and separators within the element clamping means.

In some instances, the interengagement of the battery plates with the grooves 253 of the aligning means 250 provides sufficient force to effect rotation of that member. However, it is preferable to have a separate means of rotating the mechanism 250 in timed relationship with rotation of the table 154, thereby removing from the edges of the plates the stresses produced by acting as a rack for the cylindrical member 251. In the illustrated embodiment of the machine, the aforementioned driving of the aligning means 250 is provided by a gear member 255 connected to the shaft 249 and provided with teeth around at least the portion of its periphery which sequentially cooperating with spaced segmental toothed elements or racks 256 connected with the table 154 to rotate therewith. The racks 256 are so positioned circumferentially about the table that one thereof is in cooperative engagement with the gear means 255 as each of the element clamping means for the battery elements on the burning table move past the aligning means 250. Therefore, the cylindrical portion 251 and the disc portion 252 of the aligning means are rotated with the table 154 until the battery element E adjacent the aligning means has passed from engagement therewith at which time the corresponding segmental member or rack 256 will also have passed the gear member 255. The aligning means 250 is then returned to its initial position by any suitable means as, for example, by a spring 257 connected between the bearing 248 and the gear 255.

After each clamping means with a battery element therein has passed the aligning means 250, the wall 219 of the element clamping means is firmly engaged with the element, as described above, due to the cam roller 232 passing from the cam surface 236. As the burning table 154 continues to rotate, a protective means or shield 258 is next automatically lowered upon the top of the battery element, which has been thus aligned and clamped, and this protective means is operated to hold the plate lugs of the element in proper positions for the application of plate lug straps thereto and to protect the portions of the element between the plate lugs.

There is a separate protective means 258 for each of the battery element holding or clamping means which protective means are rotatable with the burning table 154 and are vertically movable relative thereto in timed relationship with that rotation. As illustrated in Figs. 15 and 17, each of the protective means comprises a rigid frame having a hollow cylindrical portion 259 to the outer side of which transversely extending members 260 and 261 are welded or otherwise connected. Each of the members 260 and 261 has a forwardly extending portion 262 and 263 the forward ends of which are interconnected by a transversely extending portion 264. Centrally of the transversely extending portion 264 is a bolt 265 which threadedly engages the central portion 266 of a substantially rectangularly shaped plate provided with openings 267 and 268 therethrough adjacent each end. These openings have configurations such as to permit the projection therethrough of the plate lugs of a battery element and to receive the lug connecting straps and posts which are to be fused or burned to those lugs.

The forward portion of the plate 266 is provided with a sliding frame including side members 269 and 270 which each have a longitudinal recess therein in which the adjacent side edges of the plate 266 is received. The forward ends of the side members 269 and 270 are connected by a transversely extending member 271 while the rear portions of the side members 269 and 270 are interconnected by a transversely extending member 272. The member 272 is a relatively thin plate of metal which is positioned to slide on the lower surface of the plate 266 and the forward edge of the member 272 has spaced openings corresponding in dimensions and locations to the plate lugs at one side of a battery element. The configurations of the slots and intermediate portions of the member 272 have the appearance of a comb as is shown in dotted lines in Fig. 15.

The rear portion of the plate 266 is also provided with a sliding assembly including side members 273 and 274, transversely extending member 275, and a transversely extending thin comb-like member 276. These parts correspond in construction and function with the parts 269, 270, 271 and 272 of the forward sliding assembly with the comb-like member 276 being adapted to cooperate with the plate lugs at the opposite side of a battery element from that having the plate lug with which the member 272 cooperates.

The members 272 and 276 are adapted to be moved from their positions shown in Fig. 15 to the positions as indicated in Fig. 17. In the latter position, the comb-like edges of the members 272 and 276 project beneath the openings 267 and 268 of the plate 266 while the plate lugs of the battery element are received in the openings between the teeth-like portions of the members 272, 276. Hence, the said teeth-like portions and the main body of the members 272, 276, together with the plate 266, substantially cover all parts of the tops of the battery element therebeneath with the exception of the plate lugs which extend thereabove so that only the plate lugs are subjected to the flames of the burning head as the protected element is moved thereunder as hereinafter described.

The movement of the members 272 and 276 to and from the position shown in Fig. 17 is effected by a fluid pressure operated mechanism actuated in timed relationship with rotation of the burning table 154 and in timed relationship with the raising and lowering of the protective means 258. As will be apparent from Figs. 15 and 17, the fluid pressure mechanism for this purpose comprises a cylinder 277 within which a piston 278 is provided. The piston is connected with a piston rod 279 which extends through the rear wall 280 of the cylinder 277 and is connected with a substantially V-shaped member 281. This member is so positioned that the plane thereof extends parallel with the table 154 and the forward ends of the legs of the member 281 are each connected with a rod 282, 283, respectively. These rods extend parallel with the side portions 262 and 263 of the frame for the protective means and are slidable through bores in the transversely extending portions of the said frame.

The forward end of the rod 282 is connected with the side member 269 of the slidable frame carrying the comb-like member 272 by a member 284 secured to the side member 269 and having a vertically extending dove tail portion received in a correspondingly shaped opening of a cylindrical member 285 secured to the rod 282. The rod 283 is similarly connected to the side member 270 of the forward protective member 272. The transversely extending member 275 of the frame for the rear comb-like member 276 is provided intermediate its ends with a stationary T-shaped member 286 which is received in a correspondingly shaped opening of a connection 287 secured to the forward wall 288 of the cylinder 277. A conduit or pipe 289 is connected with the cylinder 277 for supplying fluid pressure between the piston 278 and the wall 288 while a conduit or pipe 290 is connected to supply fluid under pressure to the cylinder 277 between the piston 278 and the wall 280.

The construction is such that when the parts are in the positions shown in Fig. 15, the supplying of fluid pressure through the conduit 289, produces relative movement between the piston 278 and the cylinder wall 280, thereby actuating the parts to the positions shown in Fig. 17. That is to say, the piston 278 moves forwardly thus moving the comb-like member 272 forwardly and to a position beneath the opening 267 in the plate 266. The cylinder itself will move rearwardly so that the comb-like member 276 is moved from the position shown in Fig. 15 to bring it beneath the opening 268 of the plate 266. In normal operation the piston and cylinder will move substantially simultaneously in opposite directions but it is immaterial if one of these members reach its extreme position before the other since thereafter the entire force of the fluid pressure will be exerted to move the member which has not yet reached its extreme position. The extremes of movement of members 272 and 276 may be determined by any suitable means but in the disclosed embodiment the plate 266 has the forward and rear edges thereof provided with strip-like portions 291 and 292 respectively with which the comb-like members 272 and 276 abut when these members are in their operated positions.

As mentioned heretofore, each protective means 258 is lowered to place the said means in cooperation with a battery element and is raised to remove it therefrom sequentially during rotation of the burning table. This vertical movement of the protective means is under control of a stationary cam 293 of arcuate configuration which is adjustably supported upon the table-like support member 212 by a plurality of threaded members 294 that are threaded through tapped openings in the member 212 or in a tapped member secured thereto. Each of the threaded members 294 is provided with a sprocket wheel 295 and a chain 296 extends around all of the sprocket wheels 295 so that rotation of any one member 294 effects corresponding rotation of the other members with the result that the elevation of the cam 293 may be effected simultaneously in all portions thereof. This adjustment may be readily effected by means of a hand crank 297, the shaft 297a of which is rotatably supported in bracket 298 secured to the lower surface of the member 212, see Fig. 20. The shaft 297a is provided with a bevel gear 299 meshing with a second bevel gear 300 which is secured to the lower extended portion of one of the threaded members 294 supporting the cam 293.

Each of the portective means 258 has the frame thereof providing a depending rod-like member 301 which may, for example, be secured to the lower portion of the cylindrical part 259 of the protective means, see Fig. 17. The rod-like member 301 is vertically slidable through a bushing 302 provided in a cylindrical opening through the burning table 154 and the lower end of each of the rod-like members 301 is provided with a cam roller 303 supported for rotation about a horizontal axis and adapted to ride on the surface of the cam 293. The supporting frame for the protective means 258 also has the cylindrical portion 259 thereof provided with a downwardly extending rod or pin 304 which extends through an opening in the table 154 and is provided therebeneath with a coiled spring 305 which is retained on the rod by a suitable washer 306 and transversely extending pin 307.

The cam 293 has two horizontal surfaces 308 and 309 at different elevations and interconnected by inclined surfaces 310. The surface 308 is at a lower elevation, the surface 309 and the construction is such that when the roller 303 of the protective means is on the surface 308, the protective means is at its lowermost position for cooperation with a battery element E as shown in Fig. 17. However, when the roller 303 has moved upwardly onto the surface 309, the portective means 258 is raised above the battery element E so that a completed element may be removed and new element introduced between the walls 218 and 219 as hereinbefore mentioned. The spring 305 assists gravity in maintaining the cam roller 303 in engagement with the surfaces of the cam 293.

The rotatable burning table 154 is provided centrally thereof with an upstanding cylindrical portion 311 the upper surface of which carries a horizontally extending plate 312, see Figs. 14 and 20. The plate 312 provides a rotatable support for the valve means 313 which control the application of fluid pressure to the cylinders 277 for operating the comb-like parts 272 and 276 of the protective means 258. There is one valve means 313 for each of the protective means 258 and each of these valve means is provided with a valve operating member having a rotatable cam follower 314 extending therefrom radially of the burning apparatus so that the several cam followers 314 are disposed in a circle concentric with the axis of the burning table. These cam followers or rollers 314 engage the periphery of a stationary cam 315 which is mounted on a suitable support extending vertically through the central portion of the burning table.

Above the stationary cam 315 is a manifold 316 to which fluid pressure is supplied through a vertically extending pipe or conduit 317 and from which this fluid pressure is supplied to the several valve means 313 by radially extending pipes or conduits 318. The cam 315 is so shaped and positioned relative to cam 293 that the protective means 258 will have been lowered to the position shown in Fig. 17 before the valves 313 are operated to supply fluid under pressure to the rear of the cylinders 277 for operating the comb-like members. Also the cam 315 actuates the valves to subsequently supply fluid under pressure to the forward ends of the cylinders 277 for retracting the comb-like members before the protective means 258 are elevated.

The protective means 258 are constrained to move exactly vertically by virtue of spaced vertically extending support members 319 and 320 connected to the burning table 154 and extending upwardly on either side of the side portions 262 and 263 of the protective means in a manner such that these portions slide upon the members 319 and 320 when the protective means are raised and lowered. The members 319 and 320 have the further function of providing supports for horizontal extending segmental plate-like members 321 made of flame-resisting material which are provided in spaced relationship above the surface of the table to protect the portions of the mechanism therebeneath from the action of the flames of the burner means beneath which the battery elements and protective means are sequentially moved.

Referring now to Figs. 1, 14 and 20 of the drawings, it will be seen that the frame 211 of the burning station is provided with an upstanding vertically extending framework, generally designated 322, which is located substantially diametrically opposite the transfer mechanism T. The framework 322 comprises suitable plates and/or structural steel members welded or otherwise connected together and to the frame 211 so as to extend adjacent the periphery of the burning table 154, the upper portion of the framework 322 having a part extending over a portion of the surface of the table and spaced thereabove. The side members of the framework 322, adjacent the top thereof, are each provided with vertically extending rods or shafts 323 and 324 suitably secured to the sides of the framework in parallel relationship therewith and with each other, the rods being spaced from the framework sufficiently to permit sliding movement thereon of a burning head, generally designated 325.

The burning head 325 includes a transversely extending member 326, slidably guided on the rods 323 and 324, and a depending frame 327 of substantially rectangular configuration which supports two spaced rows of flame producing means or burners for cooperation with the plate lugs of a battery element. In the illustrated embodiment, the flame producing means or burners comprise two rows of jets or nozzle members 328 there being five such nozzles for each row thereof with the rows spaced radially of the burning table a distance corresponding to the distance between the plate straps of a battery element. Although five such nozzles have been shown in each row thereof, it will be apparent that a greater or lesser number may be employed if desired.

The nozzles or jets 328 are each shown as provided at the lower end of spaced vertically extending tubes 329 with the upper ends of the tubes for each row thereof connected, respectively, with separate apertures in manifolds 330 and 331 supported upon the burner frame 327. Each manifold 330 and 331 is provided with two longitudinally extending passageways 332 and 333, each of which communicates with each of the apertures for the several tubes 329. Gas is supplied to one of the longitudinal passages, for example, that designated 332, by means of suitable pipes or conduits 332 while the other of the longitudinal passages, for example, the passage 333, communicates with a source of combustion supporting material, such as air or the like, by means of a pipe or conduit 335. The supply of fuel and combustion supporting material to each of the jets or nozzles 328 is individually adjustable by means of separate valves in the passageways which communicate the longitudinal passages such as 332 and 333 with the pipes 329. Thus, each of the nozzles is provided with a valve 336 for adjusting the supply of fuel thereto and each of the nozzles likewise has a valve 337 associated therewith to control the flow of combustion supporting material, such as air, to the jet or nozzle member. Hence the length of the flame or the intensity thereof of each of the nozzle members 328 may be individually adjusted so that the desired size and heating effect of the flames can be secured.

The burning head 325 with the jets or nozzle members 328 can be adjusted vertically as a unit by means of a chain 338 connected thereto, and extending upwardly of the framework 322 and over direction changing sprockets 339 and 340 to a piston rod 341, the lower end of which is connected to a piston 342 slidable within a cylinder 343. The cylinder 343 is provided with connections for the supply of fluid pressure to, and exhaust from, either end of the cylinder through the pipes or conduits 344 and 345. These pipes or conduits are also connected with a manually operable valve 346 for control of the supply of fluid pressure to the cylinder 343, the valve 346 being connected with a source of fluid pressure by means of a pipe or conduit 347.

The construction of the burning head support is such that, in the normal operating position, the head 325 occupies the position shown in Fig. 20 so that the nozzles or jets 328 are in proper position with respect to the battery elements carried therebeneath. Hence, the flames from the nozzles engage the battery plate lugs, and the straps applied thereto, thereby fusing or burning these parts together as the battery elements are carried beneath the flames by rotation of the table 154, it being remembered, that the battery elements are clamped between the walls 218 and 219 and have had the protective means 258 applied thereto prior to passage of the elements beneath the burner head.

If it be desired to elevate the burning head to an in-
operative position, this may be rapidly effected by the operator engaging and moving the handle 348 of the valve 346, thereby supplying fluid under pressure to the cylinder 343 through the conduit 344. This will move the piston 342 downwardly within the cylinder so that the burning head 325 is raised by virtue of the chain 338 being connected to the piston rod 341. The burning head may be restored to its lower operative position by simply returning the valve handle 348 to its initial position so that fluid pressure is no longer supplied through the conduit 344. The fluid pressure is now supplied through the conduit 345 and hence the parts will be in the position shown in Fig. 20.

Adjustment of the operative position of the burning head is effected by actuation of a manual crank 349. This crank is connected to a short shaft journalled in a bracket 350 connected to the side of the framework 322. The said shaft has the inner end provided with a bevel gear 351 which meshes with a bevel gear 352 connected to a screw 353. The screw 353 is rotatably supported by the bracket 350 and by a bracket 354 spaced above the bracket 350 and connected with the framework 322. Intermediate its ends, the screw 353 is threaded in a tapped bore through a member 355 which is connected to the cylinder 343, the cylinder being slidably guided by the brackets 350 and 354. It will be apparent, therefore, that rotation of the crank 349 moves the cylinder 343 vertically and correspondingly alters the position of the nozzles 328 relative to the element supporting and protective means. This adjustment of the position of the burner means does not, however, affect the mechanism for moving the burning head to an inoperative position which, as mentioned before, is under control of the valve 346.

In operation, assembled battery elements are sequentially supplied to the burning station by the transfer mechanism T, these elements being received between the walls 218 and 219 of the element clamping means. As the burning table 154 rotates, each wall 219 moves into engagement with the element between it and the cooperating wall shortly after the element is delivered therebetween but this movement of wall 219 does not immediately clamp the plates and separators of the element with the maximum clamping force. Therefore, as the table 154 continues its rotation and the battery element moves past the plate and separator aligning means 250, the latter acts upon the plates and separators of the element to properly align them with each other and with respect to the element supporting means. Shortly thereafter, the full clamping force of the movable wall 219 is exerted upon the element and the protective means 258 associated with the element holding means is lowered onto the top of the battery element E.

At this time the comb-like members 272 and 276 are retracted so that the openings 267 and 268 of the protective means 258 are unobstructed thereby permitting the battery plate lugs to extend therethrough. With the protective means in this position, the burning table 154 will have rotated to a position in which the cam 315 is operative to supply fluid pressure to the cylinder 277 of the protective means, thereby actuating the comb members 272 and 276 so that the finger-like portions of these members engage between the plate lugs of the element, thereby properly holding the plate lugs in position for placing a plate lug connecting strap thereon and also providing a shield for the portions of the battery element therebeneath. As the burning table continues to rotate, the operator places a plate lug connecting strap in each of the openings 267, 268 of the protective means with the strap engaging the lugs in the manner which is known in the art. The straps are so placed prior to passage of the supported and protected element beneath the burning head 325 and during which passage the flames from the jets or nozzles 328 fuse or burn the plate lugs to the plate straps supplied thereon, the rate of rotation of the table 154 and the intensity of the flames provided by the burning head being so correlated that the fusing of the plate connecting straps and lugs is completed by the time the battery element has passed from beneath the nozzles or jets 328.

After the battery element has passed from beneath the burner head, the cam 315 actuates the associated valve 313 thereby supplying fluid pressure to the cylinder 277 so that the protective comb-like members 272 and 276 are retracted after which continued rotation of the burner table carries the cam roller 308 of the protective means onto the elevated portion 309 of the cam 293, thereby elevating the protective means 258 above the element. Subsequentially, the cam roller 232 on the lever which actuates the movable wall 219 is elevated thereby releasing the clamping force on the battery element so that the latter may be withdrawn from the burning table.

The take-off station

The take-off station T. O. for removing the completed battery elements from the burning table 154 is located adjacent the periphery of the table, a distance of approximately 270° of arc from the transfer station T as measured in the direction of rotation of the table. The apparatus T. O. comprises a suitable supporting frame 356 which is constructed substantially like a table, the upper surface portion of which is a plate-like member 357 that extends substantially horizontally. The frame or table 356 is preferably connected to the frame 211 of the burning station by suitable transversely extending members 358 to prevent relative shifting therebetween and to impart rigidity to the apparatus.

The plate-like portion 357 is provided with a cylindrical member 359 extending upwardly therefrom, see Fig. 23, on which a plate-like member or table 360 is rotatably supported. Thus, a cylindrical flange 361 is connected to the lower side of the member 360 and is rotatably supported upon the member 357 by suitable bushings 362, 363 and a thrust bearing 364, the latter being provided between the lower portion of the flange 361 and a collar or the like supported upon the table-like portion 357. The plate-like member 360 is also provided with a second cylinder flange 365 concentric with the flange 361. The flange 365 is provided with an external ring gear 366 which is rotated by the bull gear 214 of the burning station through the medium of gears 367 and 368 that are rotatably supported upon spaced parallel shafts 369 and 370, respectively, extending upwardly from the top of the table-like surface 357. It will be seen, therefore, that the rotatable take-off member or table 360 is rotated in timed relationship with the burning table 154 and in the opposite direction.

In addition to the gear 366, the rotatable table or member 360 of the take-off station is provided with a gear 371 which is connected with the cylindrical flange 361 of the table 360 and meshes with a spur gear supported on the upper end of a shaft 372. This shaft is rotatably carried by a suitable bracket such as 373 secured to the framework 356 of the take-off station and is connected by suitable gearing with a transversely extending shaft or shafts 374 which are also supported by the frame 25 of the assembling station, see Fig. 2. A universal joint or similar expedient 375 is preferably provided in the shaft or shafts 374 to facilitate installation of the equipment and prevent difficulties due to slight misalignment of the bearings for the shaft or shafts 374. The shaft or shafts 374 are provided with a sprocket wheel 376 which effects driving of the cam shaft 97 of the assembling station by means of a chain 377 extending about the sprocket 376 and a sprocket 378 on the said cam shaft. It will be seen, therefore, that the operation of the assembling station is in predetermined timed relationship with that of the burning station and the take-off station, since these several stations are directly interconnected.

Reverting now to Figs. 1, 22 and 23, it will be seen that the rotatable member or table 360 of the take-off station T. O. is provided with a plurality of jaw-like units 379, each of which comprises a pair of cooperating jaws or members 380 and 381. The members or jaws 380 and 381 are each pivotally supported at the outer ends of bent levers 382 and 383. The portions of the bent levers 382 and 383 on which the jaw members 380, 381 are mounted are substantially straight and, in the element engaging position of the jaw members, extend substantially parallel with each other as is indicated in the left-hand portion of Fig. 22. Beyond the straight portions of the levers 382 and 383, the latter are curved towards each other and are pivotally connected together by a pivot pin 384 which is supported in a bracket 385 secured to a plate 386. The plate 386 of each jaw unit 379, is, in turn, pivotally supported upon the table-like member 360 of the take-off station by means of a stud 387 which is provided with a bushing 388 that extends through the plate member 386 and a spacer plate 389, the lower end of the stud 387 being of reduced diameter and threaded for reception of a nut 390 which prevents displacement of the stud.

The jaw-like units 379 are movable with the rotating table 360 of the take-off station and relatively thereto about the pivots 387 to thereby enable each pair of jaw members 380, 381 to engage an element on the burning table and withdraw the latter therefrom after which the withdrawn element is positioned for delivery to a conveyor such as C, see Fig. 1. To effect this movement of the jaw-like units, the supporting plate 386 thereof has a cam roller 391 rotatably secured on the under surface thereof as by means of a vertically extending bolt or stud 392. These cam rollers 391 ride in a closed cam path 392 or track provided by the irregularly shaped groove 393 formed in one or more plate members 394 that are stationarily secured to the central portion 359 of the take-off apparatus.

The shape of the cam groove or path, 393 is shown in Fig. 22 from which it will be evident that, when the jaw members 380, 381 have engaged an element on the burning table 154 at the position indicated at the left in Fig. 22, the said jaw members will be moved as a unit in a manner such as to remain substantially radially relative to the table 154 during continued rotation of the latter. This enables the jaw members to withdraw the completed battery element from between the walls 218 and 219 upon the burning table without interference therewith, the walls having been omitted from Fig. 22 to facilitate illustration of the jaw members. As the burning table 154 and take-off table 360 rotate, the completed element clamped between the jaw members 380, 381 will eventually be completely withdrawn from the burning table after which the jaw members are moved as a unit to restore the same to a substantially radial position relative to the take-off table 360, after which the jaw members are located above the conveyor C and are separated for release of the element held therebetween.

The jaw members 380 and 381 are normally urged away from each other by spring means and are actuated into gripping position by fluid pressure operated mechanism. In the illustrated embodiment this mechanism includes a link 395 which has one end pivoted to the lever 382 in the curved portion of the latter and a link 396 which has one end similarly pivoted to the lever 383 at a corresponding point on that lever. The other ends of the links 395 and 396 are pivotally connected together and to a cross-head member 397 by a pivot pin 398. The cross-head member 397 has a transversely extending portion the outer ends of which are each connected with one end of a pair of tension springs 399 and 400. The other ends of the tension springs 399 and 400 are connected to a transversely extending member 401 supported at the rear of a cylinder 402 which is mounted upon the jaw unit supporting plate 386. The cylinder 402 is provided with a piston 403 which is connected with the cross-head 397 by a piston rod 404.

The application of fluid under pressure to the cylinders 402 of the jaw units 378 is controlled by individual valves 405 which are supported upon the rotating table 360 of the take-off station by elongated brackets 406 that extend inwardly over the stationary cam member 394 so that the valves 405 are disposed adjacent a smaller stationary cam 407 which is supported on the top of the stationary cylindrical member 359. Fluid under pressure for operating each piston 403 is supplied to its cylinder 402 through the corresponding valve 405 from a stationary manifold 408 which is supported centrally above the take-off station by the pipes 409, that connect the manifold to the valves 405, the manifold being rotatable with the table 360 about the central vertically extending supply pipe 410.

As mentioned heretofore, the jaw members 380 and 381 of each unit 379 are pivotally supported on the levers 382 and 383, respectively. This facilitates alignment of the jaws with the side plates of a battery element, each jaw member being normally held in parallel relationship relative to its supporting lever by a light spring such as 411. The jaw members 380 and 381 preferably have the forward edges shaped arcuately, as shown in Fig. 23, and the side walls 218 and 219 of the battery element supporting means on the burning table 154 have cut-out portions such as 412 of complementary shape relative to the jaw members 380 and 381 but of slightly larger dimensions to enable the jaw members to engage an element while the latter is supported by the walls 218 and 219.

It will be observed that the take-off station in the illustrated form of the invention comprises but three jaw units 379 whereas the burning table has nine element supporting and protective means. This is possible because the burning table rotates relatively slowly and hence only one-third as many jaw units 379 are needed to effect proper removal of the completed elements, the table 360 of the take-off station being rotated at three times the speed of the burning table 154.

When the machine is in operation, completed battery elements are carried by the burning table 154 to a position adjacent the take-off station and, as a jaw unit 379 moves into cooperative relationship with an element supporting means, the jaw unit supporting plate 379 will be positioned so that it extends substantially radially of the table 360 with the jaw members 380 and 381 separated to their open position under influence of the springs 399 and 400. The continued rotation of the take-off table 360 carries the valve 405 for the jaw unit 379 which is adjacent a battery element on the burning table 154 onto that portion of the cam 407 which operates the valve so that fluid under pressure is supplied to the cylinder 402 in the direction which moves the piston 403 to bring the jaw members 380 and 381 into engagement on opposite sides of the battery element on the burning table. The continued rotation of the burning table 154 effects release of the clamping pressure exerted by the element supporting wall 219, as will now be apparent, and the continued rotation of the take-off table 360 causes the cam roller 398 to move the jaw unit 379 in a manner such that the battery element between the jaw members 380 and 381 is withdrawn from the burning table, this withdrawing movement being substantially radially of the burning table thereby preventing damage to the element by engagement with the wall 218 or other stationary parts carried on the burning table.

When the take-off table 360 has rotated the removed element through substantially one-half a revolution of the table 360, the valve 405 associated with the cylinder 402 which is maintaining the jaw members 380 and 381 engaged with the element engages the portion of the cam 407 which actuates the valve 405 to a position in which fluid pressure is no longer supplied behind the piston 403 whereupon the cylinder is now connected to atmosphere through the valve. Therefore, the springs 399 and 400 move the jaw members to element releasing position so that the completed battery element is deposited on the conveyor C and is carried thereby to a point of utilization or storage as the case may be.

*Fluid pressure system*

Throughout the description of the several stations of the machine reference has been made to the fluid pressure mechanisms for operating various units. While any suitable fluid pressure may be employed, the illustrated embodiment of the machine preferably utilizes air pressure which is supplied to the several parts of the machine in a manner schematic represented in Figs. 24A and 24B of the drawings. These figures, when joined together along the broken line A—B, shows the operative relationship of the several valves and cylinders heretofore described, certain portions of the mechanism being indicated in broken lines to facilitate an understanding of where the various parts shown in full lines are located in the complete machine. In the illustrated embodiment of the fluid pressure system, various conventional expedients such as pressure regulating valves, lubricating means, and the like which are well understood in the art have been omitted for the sake of clarity. It will be understood, however, that these and other known expedients may be supplied in the mechanism wherever needed or desired.

Air under pressure is supplied from a suitable means through a conduit 413 to a pressure regulator 414 from which the air at high pressure is supplied to a manifold 415. The conduit 413 is also connected to a pressure regulator 416 from which a conduit 417 leads to a lower pressure manifold 418. From the manifold 415 a conduit 419 is connected with a manual shut off valve 420 and from the latter a conduit 421 extends to a pressure regulator 422, see Fig. 24B. The pressure regulator 422 is connected to the pipe or conduit 347 that supplies the air under pressure to the valve 346 of the burning head actuator, the air pressure being selectively supplied through the conduit 344 or conduit 345 to the cylinder 343 with the pressure being maintained at proper value by flow controllers 423 and 424 of conventional construction.

The conduit 421 is also connected to a conduit 425 which, in turn, is connected with a pressure regulator 426 that is connected to the supply pipe 317 for the rotating manifold 316 of the burning apparatus B. The pipes or conduits 318 leading to the valves 313 for the element protective means 258 are connected to this manifold 316, one only of the valves and protective means being indicated in Fig. 24B.

The conduit 421 is also connected to a conduit 427 which, in turn, is connected to a pressure regulator 428 for the take-off station. This pressure regulator is connected with the conduit or pipe 410 which supplies the fluid pressure to the manifold 408 and from which the pressured fluid flows through the pipes or conduits 409 to the valves 405 that control the flow of fluid to the cylinders 402 of the jaw operators as previously described.

The high pressure manifold 415 is connected to the valves 79, 80, 81, 82, 83, and 84 by the pipes or conduits 429, 430, 431, 432, 433, and 434, respectively. These valves are each provided with two conduits one of which is connected to an exhaust manifold 435 and the other of which is connected with the associated cylinder in the assembling station. Thus, the valve 79 is connected by a conduit 436 to a flow controller 437 which, in turn, is connected with the rear portion of the cylinder 42 for moving the negative plate feeding and delivery slide 34. The other end of cylinder 42 is connected with the lower pressure manifold 418 by means of a conduit 438 and an interposed flow controller 439. Likewise, the valve 80 is connected with the rear portion of the separator feeding cylinder 52 by a conduit 440 and a flow controller 441 while the other end of this cylinder is connected with the lower pressure manifold 418 by suitable conduits 442 and 443 between which a flow controller 444 is interposed.

The valve 81 is connected to the rear end of the cylinder 76, which effects removal of an element from the assembling station, by means of a conduit 445 in which is interposed a flow controller 446. The other end of the cylinder 76 is connected with the lower pressure manifold 418 by a conduit 447 and interposed flow controller 448. The valve 82 is connected with the lower end of the cylinder 30, which controls the vertical movement of the platform 27 of the assembling station, by means of conduits 449 and 450 in which are interposed suitable flow controllers 451 and 452. The upper end of the cylinder 30 is connected to the lower pressure manifold by a conduit 453 in which is interposed a flow controller 454.

The valve 83 is connected to the rear end of the cylinder 56, which effects feeding of the separators onto the positive plates, by means of a conduit 455 in which is interposed a flow controller 456. The other end of the cylinder 56 is connected with the lower pressure manifold 418 by a conduit 457 in which is interposed a fluid controller 458. The valve 84 is connected by a conduit 459 to the rear end of the cylinder 46, which effects movement of the positive battery plates from the magazine thereof to the platform 27, a flow controller 460 being interposed in the conduit 459 between the valve 84 and the cylinder 46. The other end of the cylinder 46 is connected with the lower pressure manifold 418 by a conduit 461 in which is interposed a flow controller 462. The manually rockable valve 113 is connected with the high pressure manifold 415 by a conduit 463 and from this valve the air under pressure is supplied to the cylinders 107 for moving the members 108 and thereby rocking the valve support 88 into valve operative position. Each of the valves 79 to 84 and the valve 113 are vented to atmosphere, the valves 79 to 84 being connected to a common exhaust manifold 435 for this purpose while the valve 113 exhausts directly to the air.

It will be apparent, therefore, that when one of the valves such as 79 is operated by a cam on the cam shaft 97, high pressure air is supplied through the valve to the rear of the corresponding cylinder, such as 42, moving the piston therein forwardly and thereby effecting movement of the attached feeding and delivery slide 34 in the direction which feeds a negative plate to the platform 27. In a similar manner, operation of the valve 84 causes forward movement of the positive feeding and delivery slide 44 while actuation of the valves 80 and 83 effect feeding of separators from each of the separate separator magazines 47 and 48, respectively. During this forward movement of the pistons in the cylinders which are thus supplied with high pressure air, the regions in advance of the pistons are in continuous communication with lower pressure air from the manifold 418. Therefore, when the cams actuating the valves 79, 80, 83 and 84 pass beyond these valves, so that the latter return to their initial positions terminating the supply of high pressure air to the rear of the corresponding cylinders, the lower pressure air acting in the forward region of the cylinders is effective to return the pistons in the cylinders and the attached slides to their initial positions. At this time, the pressure intially supplied to the rear of the cylinders is vented through the valves to the exhaust manifold 435. The valves 81 and 82 operate in a similar manner for controlling the movement of the element removing member 75 and the elevation of the platform 27 on which the elements are assembled.

The flow controllers in the various air supplying lines are of conventional construction and function to maintain a proper volume of air under pressure at the desired operating pressure as will be understood by those familiar with pneumatic systems. The flow controllers associated with the bottom of cylinder 30 perform the further function of preventing too rapid a descent of the platform 27 as an element is being assembled thereon.

The valve 113 is likewise a three-way valve which, when operated by a cam on the cam shaft 97, supplies high pressure air to the cylinders 107 for moving the valve supporting member 88 to operative position. However, when the valve 113 is removed from operating position by means of a handle 118 it terminates the supply of high pressure air to the cylinders 107 and permits the latter to vent to atmosphere so that the bar or support 88 rocks to the inoperative position for the valves mounted thereon.

Each of the slide operating valves 79, 80, 83 and 84, the element removing valve 81, and the valve 82 controlling the movement of the platform are shown and have been described as being of the three-way type with the corresponding operating cylinders having a lower pressure air acting at the other end of the cylinder from that into which high pressure air is introduced. It will be apparent, however, that four-way valves could be employed in place of the three-way valves with the high pressure air alternately connected through these valves to the opposite ends of the cylinders while the other end is simultaneously vented to atmospheric pressure, thereby eliminating the need for the low pressure line as illustrated. This alternate construction is considered well within the purview of one skilled in the art and hence there is no necessity for separate illustration and description thereof since the essential principles of the mechanism are not altered by such a change.

The fluid pressure for operating the conveyor 78, by which the assembled elements are moved towards the burning station, is supplied through the conduit 463 and the cam controlled valve 149 to a conduit 464 and thence to a pilot operated valve 465. The flow controlling portion of this valve is connected by conduits 466 and 467 to the opposite ends of the conveyor actuating cylinder 136, suitable flow controllers 468, 469 and 470 being provided in the conduits 464, 466, and 467, respectively, to provide the proper air pressure conditions as will be readily understood. The conduit 464 supplies the control pressure for operating the valve 465 while the fluid pressure for effecting operating of the conveyor is supplied from the manifold 415 through a manual shut-off valve 471 and a conduit 472 to an automatic pressure regulator 473 and from the latter through a conduit 474 to the valve 465. Exhaust for the cylinder 136 is provided through the valve 465 and the conduits 475 and 476 which are connected to the exhaust manifold 435.

The construction just described is such that when the cam 147 on the cam shaft 97 actuates the valve 149 control fluid pressure is supplied through the conduit 464 to the valve 465 actuating the latter in the direction which supplies fluid under pressure from the conduits 472 and 474 to the conduit 467 and hence to the rear of the cylinder 136 thus moving the conveyor 78 the predetermined distance established by the length of stroke of piston 137. The other end of the cylinder 136 is simultaneously connected to the exhaust conduit 475 through the valve 465. When the cam 147 on the cam shaft 97 releases the valve 149, the termination of the supply of fluid pressure through the conduit 464 enables the valve 465 to now supply fluid under pressure from the conduits 472 and 474 to the conduit 466 and the forward end of the cylinder 136 at which time the other end of the cylinder is vented through the conduits 467, valve 465 and conduits 475 and 476. In place of the pilot valve 465 it is of course possible to employ a single valve mechanism, response to a cam on the cam shaft 97, for supplying the operating fluid pressure alternately to the opposite ends of the cylinder 136.

The fluid pressure supply conduit 472 is also connected to a pressure regulator 477 by a conduit 478. A conduit 479 extends from the pressure regulator 477 and to this latter conduit is connected a conduit 480 which in turn is connected with the valve 158 which is operated by the conveyor cross-head 139 when it is at one extreme position. The valve 158 is connected through a conduit 481 and a flow controller 482 to the rear end of the cylinder 155 which effects movement of the transfer carriage 151. The valve 159 actuated by the cross-head 139 of the conveyor operating mechanism in its other extreme position is connected between the low pressure manifold 418 and a pilot valve 483 by conduits 484 and 485. The pilot operated valve 483 is connected by a conduit 486 to the fluid pressure supply conduit 479 and this valve is also connected to the exhaust manifold 435 by conduits 487 and 476. The pilot operated valve 483 is connected by conduits 488 and 489 to the forward end of the cylinder 155 there being a flow controller 490 interposed between the conduits 488 and 489.

It will be evident, therefore, that when the cross-head 139 of the conveyor operating mechanism is at the position indicated in broken lines in Fig. 24B, valve 158 will be operated to supply fluid pressure through the conduits 480 and 481 to the rear of the cylinder 155 thereby moving the carriage 151 in a direction away from the conveyor. At this time the forward portion of the cylinder 155 will be exhausted through the conduits 489, 488, valve 483, and conduits 487 and 476. However, when the conveyor actuating cross-head reaches its other extreme position it will engage and operate the valve 159. Meanwhile, the valve 158 will be released. Therefore, low pressure fluid is now supplied through the valve 159 to the pilot operated valve 483 actuating the latter to a position in which communication is established between the pressure conduit 486 and the conduits 488, 489 connected to the forward end of the cylinder 155, the communication of conduits 488 and 489 with the exhaust conduit 487 being terminated. Therefore, the carriage 151 of the transfer station is now moved towards the conveyor 78 with the fluid pressure in the portion of the cylinder in advance of the piston being exhausted through the valve 158.

The valves 186 and 189 for controlling the supply of fluid under pressure to the opposite ends of the transfer mechanism tilting cylinder 181 are connected with the pressure supply conduit 479 by conduits 491 and 492, respectively. The outlet of valve 189 is connected to one end of the cylinder 181 by a conduit 493 in which is interposed a suitable flow controller 494. The valve 186 has the outlet thereof connected to the other end of cylinder 181 by a conduit 495 with a flow controller 496 interposed between the valve and the cylinder.

It will be evident therefore that when the valve 186 is actuated by the transfer carriage 151 high pressure air will be supplied through the valve 186 to one end of the cylinder 181 to effect tilting of the jaws 164 and 165 thereof. As the carriage 151 continues its movement, the valve 186 is released so that the supply of fluid under pressure therethrough is terminated. The jaw members will however remain in the position to which they have been tilted by the force of gravity acting thereon. When the carriage has moved to the position such that it actuates the valve 189 fluid under pressure is supplied through the conduit 493 to the other end of the cylinder 181 thereby tilting the jaw members 164, 165 to the other position thereof where they will remain under the influence of gravity even after the valve 189 is released by the carriage 151 moving therepast. When one of the valves 186 or 189 is actuated to supply fluid under pressure to the cylinder 181 the other end of the cylinder is vented through the other of the two valves. The flow controllers 494 and 496 are of conventional construction and are provided to insure proper supply of fluid under pressure for effecting the aforementioned operations.

A conduit 497 is connected to the fluid pressure supply conduit 478 and to the valve 175 which controls the supply of fluid under pressure through the conduit 498 to the cylinder 173 which actuates the movable jaw 165 against the force of the springs normally tending to maintain the jaw in clamping position. Therefore, when the carriage actuates the valve 175 fluid pressure is supplied to the cylinder 173 increasing the space between the jaw members 164 and 165 for engagement with a battery element. As the carriage passes over the valve 175, the supply of fluid pressure to the cylinder 173 is terminated and the latter is now vented through the valve 175. Therefore, the springs 171 and 172 move the jaw 165 into clamping engagement with the battery element.

The valve 198 controlling the supply of fluid pressure to the push-in cylinder or means 193 is connected between the conduit 497 and the cylinder 193 by conduits 499 and 500. Therefore, when the carriage 151 engages and operates the valve 198, fluid under pressure is supplied through the conduits 497 and 499 to and through the valve 198 and conduit 500 to the cylinder 193 so that the member 197 engages a battery element on the conveyor 78 and moves the latter between the jaws 164 and 165 of the transfer mechanism. When the carriage 151 has moved sufficiently to release the valve 198, the supply of fluid pressure to the cylinder 193 is terminated and the latter is vented through the valve 198 so that the member 197 is returned to its initial position by a spring or other expedient not shown.

The valve 206 controlling operating of the cylinder 205, which moves a battery element from the transfer mechanism to the burning station, is connected between the pressure supply conduit 491 and the rear end of the cylinder 205 by conduits 501 and 502, there being a flow controller 503 interposed in the latter conduit. The other end of the cylinder 205 is connected with the low pressure manifold 418 by a conduit 504, there being a flow controller 505 in the conduit 504 adjacent the connection thereof to the forward end of the cylinder 205.

It will be evident, therefore, that when a cam 209 on the burning table 154 engages the valve 206 fluid under high pressure is supplied to the rear of cylinder 205 thus causing the member 202 to move forwardly and push a battery element from between the jaws 164 and 165 of the transfer mechanism and onto the burning apparatus so that the element is disposed between the walls 218 and 219. As the burning table 154 continues its rotation carrying the cam 209 beyond the valve 206, the release of the latter terminates the supply of high pressure fluid to the rear of cylinder 205 and vents it through the valve 206. Then the lower pressure air, continuously supplied through the conduit 504 to the forward end of the cylinder, returns the member 202 to its initial position. Alternatively to the use of low pressure air for this function, it will be apparent that a suitable valve or valves could be provided for supplying high pressure air to the forward end of cylinder 205 to effect return of the member 202.

Summary of operation

Although the operation of each of the various stations of the machine have been described in conjunction with the detailed explanation of the manner in which the mechanisms are constructed, it is believed that an understanding of the mode of operation of the entire machine will be facilitated by a brief resume of the manner in which it functions during normal use. In preparing the machine for operation, the magazine 31 is supplied with a quantity of negative battery plates, the positive magazine 32 is supplied with a quantity of positive battery plates, and the separator magazines 47 and 48 are each supplied with quantities of battery plate separators. The valve supporting plate or bar 88 is then adjusted, by means of the knob 106 to dispose the several valves, 79 to 84 inclusive, in alignment with that set of cams 96 corresponding to the size of the battery elements which are to be assembled. That is to say, if an element having seventeen plates is to be assembled, the knob 106 is turned to bring the arm 109 into alignment with the corresponding notch 110 in the plate 105 and this will correspondingly align the valve operators with the proper set of cams for assembling a battery element having the aforementioned number of plates. If the battery element is to have a different number of plates, the knob 106 is turned to bring the arm 109 into alignment with the appropriate notch 110 thereby moving the bar 88 and the valves 79 to 84 to align the latter with the appropriate set of cams 96.

The separate valves for the burner jets or nozzles 328 are then adjusted to provide flames of the desired size and character and the crank 349 is adjusted to dispose the flame jets or nozzles at the desired elevation above the burning table 154 after which the valve 346 is operated to move the burning head to inoperative position until the machine is to begin its operation. The elevation of the bar-like cam 237 and the elevation of the cam 293 are then adjusted by means of the hand wheel 244 and crank 297, respectively, so that the extent of opening between the element clamping walls 218 and 219 will be a proper size for reception of a battery element therebetween and the protective means 258 will be lowered to the proper elevation for cooperation with the battery elements being assembled. Also the protective means 258 will be provided with reciprocating comb-like members 272 and 276 of proper size and configuration for cooperation with a battery element having the number of plates as selected by the adjustment at the assembling station.

With the machine thus conditioned, operation is commenced by actuating the handle 348 to lower the burning head to operative position and the motor or other power means which drives the belt 216 is started. Hence the burning table 154, the take-off table 360 and the cam shaft 97 which are interconnected by positive driving connections therebetween are rotated in predetermined timed relationship. The operator then grasps the handle 118 of the valve 113 and rocks the latter to its substantially vertical position as indicated in Fig. 6 where it is held by the spring pressed detent 117 engaging in the notch or recess 115. As the cam shaft 97 rotates, the lobe 121 on the cam 122 will engage the cam follower 120 thereby operating the valve 113 to supply fluid pressure to the cylinders 107. This rocks the bar or supporting member 88 for the valves of the assembling station into position for actuation of the valves by the cams 96 on the cam shaft 97. Hence, as the cam shaft 97 rotates, the valves 79 to 84 are operated in the proper sequence to effect assembling of a battery element on the platform 27.

The cams on the shaft 97 are preferably such that the valves 79 and 84 are operated substantially simultaneously thus delivering a negative battery plate and a positive battery plate from the respective magazines thereof, the plates being carried on the intermediate portions such as 36 of the slides 34 and 44 into positions in alignment with the path of movement of separators from the magazines 47 and 48. The valves 80 and 83 which effect feeding of separators from each of the magazines 47 and 48 are also actuated substantially simultaneously and at a time such that the separators delivered from the magazines are deposited upon the tops of the battery plates on the slides 34 and 44. As the valves 79 and 84 are released by continued rotation of the cam shaft 97 the slides 34 and 44 return to their initial positions at which time the pawls or dogs, such as 58, engage the plates and separators on these slides moving them from the intermediate portions 36 of the slides onto the forward portions, such as 37 thereof, which portions are then substantially aligned with the separator magazines 47 and 48.

Further rotation of the cam shaft 97 again operates the valves 79 and 84 thereby again feeding forwardly a negative battery plate and positive battery plate, as previously described, upon which plates separators are deposited by operation of the valves 80 and 83. The second forward movement of the slides 34 and 44 has also carried the battery plates and separators thereon to positions above the movable platform 27 substantially in the manner shown in Fig. 3. Hence when the valves 79 and 83 are released so that the slides 34 and 44 return to their initial positions, the plates and separators which have been positioned above the platform 27 are removed from the slides by the stripper pawls or dogs 60 and 61 so that the plates and separators drop onto the platform 27 in superposed vertical or stacked alignment with a negative battery plate lowermost, a separator resting thereon, a positive battery plate on the first separator and the second separator on top of the positive battery plate. As the plates and separators are thus deposited upon the platform 27 the latter moves downwardly under the load so that it is ready to receive a new supply of battery plates and separators through repeated action of the valves 79, 80, 83 and 84.

The delivery of additional battery plates and separators to the platform 27 occurs, in the manner just described, due to the continued rotation of the cam shaft 97, the cams on which have a plurality of lobes for operating the valves the necessary number of times during the rotation of the shaft to assemble a battery element of the desired size. Moreover, each movement of the plate carrying slides 34 and 44 to the forwardmost positions thereof, the pivoted members 64 to 67 extending vertically adjacent platform 27 are operated inwardly to the full line positions shown in Fig. 3 thereby acting upon the edges of the battery plates to effect vertical alignment thereof.

The continued operation of the valves 79, 80, 83 and 84 is in the sequence just mentioned until the next-to-the-last stroke or movement of the slide 34. When this point in the cycle is reached, the cam operating the valve 80 has a lobe omitted so that a negative separator is not fed onto the negative battery plate which is delivered into the position in alignment with the magazine 47. On the following stroke of slide 34 the cams which operate valves 83 and 84 have no valve operating lobes with the result that these valves are not actuated and hence the slide 44 remains in its initial position. The valves 79 and 80 however are operated so that the single negative battery plate which was disposed on the forward portion 37 of the negative plate slide is now delivered to the platform 27 and a negative plate and separator are in position for movement onto the portion 37 of the slide when the latter is retracted. Consequently, a complete battery element has then been assembled with negative battery plates at the top and bottom thereof and with the slides 34 and 44 in like condition in preparation for a new cycle of operation for assembling another battery element.

With the completion of the assembling of a battery element on the platform 27 the latter will have reached its lowermost position at which time the cam on the shaft 97 cooperating with the valve 81 actuates the latter supplying fluid pressure to the cylinder 76 so that the member 75 moves over the top of the platform 27 pushing the assembled element from the platform and onto the conveyor 78 between a pair of upstanding plates 132 and 133 thereon. When the cam shaft 97 by its rotation carries the cam lobe past the operating position for valve 81, the member 75 is returned to its initial position and shortly thereafter the valve 82 is actuated by its cam to supply fluid pressure to the cylinder 30 thereby elevating the platform 27 to its initial position.

After the platform 27 has thus returned to its upper position, the rotation of the cam shaft 97 will have completed one revolution and the continued rotation thereof will begin a new element assembling cycle in the manner just described. The machine will then continue to assemble battery elements and move the assembled elements onto the conveyor 78 so long as the valve 113 remains operated, since it is this valve which supplies the fluid under pressure to the support 88 for the valves 79 to 84 that control operation of the assembling station. The valve 113 is maintained in operated position, once it has been disposed in the position shown in Fig. 6, by virtue of the spring pressed slide 123 which is projected over the upper surface of the valve actuating member 125 after the latter has been operated by the cam lobe 121. Consequently, the valve 113 will remain operated until the valve is bodily rocked from the position shown in Fig. 6 by the operator grasping and rocking the handle 118.

When valve 113 is thus rocked the valve operating member 125 will return to its non-operated position terminating the supply of fluid pressure to the cylinders 107 so that the valve supporting member or bar 88 rocks to its inoperative position moving the valves 79 to 84 from engagement with the cams 96. A new cycle of operation may be commenced by again rocking the valve 113 to the position shown in Fig. 6 whereupon the cam 122 will operate the valve to begin the new cycle and the valve will be maintained operated by the slide 123. It should be noted that by the construction here disclosed the valve 113 may be placed for cooperation with the cam 122 at any time during the rotation of the cam shaft 97 but the valve will not be operated until the cam lobe 121 engages the cam follower or roller 120. Therefore, assembling of battery elements always begins at the same arcuate position on the cam shaft 97 and which is the beginning of the assembling of an element.

As mentioned above, the assembled battery elements are moved from the platform 27 onto the conveyor 78 in response to rotation of the cam shaft 97. The rotation of this cam shaft also effects operation of the valve 149 which controls the supplying of fluid pressure to the cylinder 136 for intermittently moving the conveyor 78. Hence, the movement of the conveyor is in predetermined timed relationship with the delivery of battery elements thereto with the result that a pair of members 132, 133 is properly positioned for reception of an assembled battery element each time the member 75 acts to remove such an element from the platform 27.

The movement of the cross-head 139 which is actuated by the cylinder 136 for intermittently moving the conveyor 78, operates the valves 158 and 159 at either extreme of movement thereby alternately effecting the supply of fluid pressure to the opposite ends of the cylinder 155 which reciprocates the carriage 151 of the transfer mechanism T. Consequently, the carriage 151 moves towards the conveyor 78 in timed relationship with the delivery of battery elements thereto and the movement of these elements therealong. As the carriage 151 moves forwardly towards the conveyor, the valve 186 is operated to supply fluid pressure to the cylinder 181 in a direction which tilts the jaw members 164 and 165 to dispose the latter substantially horizontally. Continued forward movement of the carriage 151 operates the valve 175 thereby supplying fluid pressure to the cylinder 173 which moves the jaw 165 against the force of the springs 171 and 172. By this time the jaws will have been positioned above and below the battery element on the conveyor 78 and the carriage will actuate the valve 198 supplying fluid pressure to the cylinder 193 thereby causing the member 197 to thrust the battery element fully between the jaws 164, 165. The jaws are substantially simultaneously returned to clamping position, under the influence of their springs, since the valve 175 has been released as the member 197 is actuated.

The member 197, in addition to moving the element fully within the jaws 164, 165, also tends to tilt the element and jaws backward slightly so that the battery element does not drag on the cross bars of the conveyor as the carriage 151 begins its return movement. The tilting of the jaws and battery element therebetween is completed by operation of the cylinder 181 through the operation of valve 189 as the carriage 151 begins its return movement, the valve 189 being operated while the jaws and element are still slightly tilted as the result of the impulse imparted by the member 197. Consequently, as the carriage 151 returns to its rearward position, the battery element is clamped between the jaws 164 and 165 with the plates and separators of the element extending vertically.

Meanwhile, the burning table 154 has been rotating in timed relationship with the operation of the assembling and transfer stations and hence one of the cams 209 on the table 154 now engages and operates the valve 206. This supplies fluid pressure to the cylinder 205 of the transfer station so that the member 202 engages the battery element between the jaws 164 and 165 and moves the latter onto the burning table 154 between the walls 218 and 219 thereof and into engagement with the rear wall 218a. At this time the cam roller 232 will be on the upper surface of the cam 234 so that the movable wall 219 of the battery element holding apparatus on the burning table will be spaced sufficiently from the stationary wall 218 to allow entrance of the battery element therebetween as is indicated in Fig. 18. Also at this time the roller 303 of the protective means 258 will be on the upper surface 309 of the cam 293 so that the protective means is spaced above the element allowing free introduction of the element between the walls 218 and 219.

Shortly after the transfer of the assembled battery element to the burning table 154, the rotation of the latter carries the cam roller 232 onto the surface 236 of the cam bar 237. This allows the movable wall 219 to engage the battery element under the force of the spring 231 with sufficient pressure to hold the battery element substantially vertically while permitting slight relative shifting between the plates and separators. While thus held, the battery element passes the plate and separator aligning mechanism 250 which is rotated in timed relationship with the burning table by a cam rack 256 engaging the gear 255. This aligning apparatus 250 acts upon the battery plates and separators to dispose the vertical edges of the separators inward a predetermined distance relative to the vertical edges of the battery plates and to insure that the battery plates are fully engaged with the rear wall 218a of the holding means so that the plate lugs PL are in alignment.

As the table 154 moves past the aligning apparatus 250 the latter returns to its initial position for cooperation with the next succeeding battery element and the cam roller 232 passes from the surface 236 of the cam bar so that the full force of the spring 231 is now effective to clamp the battery element and prevent relative shifting between the plates and separators. Shortly thereafter the cam roller 303 moves from the upper surface 309 of the cam 293 thereby lowering the protective means 258 onto the top of the battery element now clamped between the walls 218 and 219, which is the position substantially as shown in Fig. 17 except that the comb-like members 272 and 276 are retracted to the position shown in Fig. 15 so that the plate lugs PL of the battery element can project through the openings 267 and 268 of the protective means.

Continued rotation of the table 154 operates the cam follower 314 of the valve 313 associated with the cylinder 277 of the protective means which has just been lowered into position to supply fluid under pressure through the conduit 290. This causes movement of both the piston 278 and the cylinder 277 in opposite directions so that the comb-like members 272 and 276 move into the openings 267 and 268 wth the finger-like portions of the comb-like members entering between the plate lugs PL. This action of the comb-like members provides a shield for the portion of the battery plate and separators other than the plate lugs which project thereabove, and also insures that the plate lugs are properly spaced and aligned for easy reception of the plate lug connector straps.

These straps are conventionally cast in substantially crowfoot form with openings between interconnected portions for the reception of the plate lugs, there being one connector strap for each of the pairs of plate lugs at either side of the battery element. Therefore, as the table rotates the operator positions a plate lug in each of the openings 267 and 268 in interengagement with the plate lugs and prior to passage of the supported and protected element beneath the burning head 325.

As the supported and protected battery element with the connector straps engaged with the plate lugs, move beneath the burner head 325, the rows of flames provided by the two rows of jets or nozzles 328 fuse or burn the connecting straps and plate lugs together. The protective means 258, by virtue of its openings 267 and 268 in the plate portion 266 and the comb-like members 272 and 276 therebeneath, serve as molds to retain in proper configuration the molten metal resulting from this fusing or burning operation.

After the battery element has passed the burning head 325 the cam follower 314 engages that portion of the cam 315 to operate the valve 313 for effecting supply of fluid under pressure through the conduit 289 and exhaust of the other end of the cylinder 277 through the valve. This causes the piston 278 and cylinder 277 to move in opposite directions and in a manner which retracts the comb-like members 272 and 276 from beneath the battery plate connecting straps and to the position substantially as shown in Fig. 15. As the table 154 continues its rotation, the cam follower 303 rises up onto the upper surface of the cam 293 thereby elevating the protective means above the battery element.

Shortly thereafter the cam roller 232 rises up the surface 246 and onto the top of the cam 234 thereby rocking the bell-crank lever 224 in the direction which moves the wall 219 away from the battery element. By this time the battery element will be in position for cooperation with the take-off mechanism T. O. which, it will be remembered, is also rotating in timed relationship with the other parts of the apparatus through the gearing drive to the burning table. This rotation of the take-off apparatus has brought a jaw unit 379 into a position substantially aligned with the battery element and with the jaw members 380 and 381 in open position under the influence of the springs 399, 400. When thus aligned with the battery element which is to be removed, the valve 405 for operation of the jaw members will have reached a portion of the cam 407 which operates the valve to supply fluid under pressure to the cylinder 402. This moves the piston 403 in the direction bringing the jaw members 380, 381 into engagement with the opposite sides of a battery element on the burning table, the walls 218 and 219 having openings 412 to permit this engagement.

As the take-off table 306 continues its rotation, the jaw unit 379 is rocked about its pivot 387 so that the jaw members 380, 381 and the element therebetween continue to extend substantially radially of the table 154 whereby the battery element is withdrawn from between the walls 218 and 219 without interference therewith. Thereafter, the continued rotation of the take-off table 360 brings the cam follower 391 into the portion of the cam groove 393 which moves the jaw unit 379 and the battery element thereon to a position in which they again extend substantially radially of the table 360. Shortly thereafter the jaw unit 379 moves about the conveyor C at which point in the rotation of the table the valve 405 for the jaw unit, thus positioned, engages the portion of the valve 407 which allows the valve to move to the position terminating the supply of fluid pressure to the cylinder 402, whereupon the springs 399 and 400 move the jaws 380, 381 away from each other and deposit the battery element upon the conveyor C.

It will be observed that the take-off station is disclosed as having three jaw-like units 379, whereas the burning station B has nine element holding and supporting means.

This is because the take-off station can be rotated at a faster rate than the burning table. It will be understood however that, if desired, the take-off station could be provided with a greater number of jaw-like units and rotated at slower speed. It will also be evident that the take-off station need not deliver the completed elements to a conveyor but may simply deposit the same upon a stationary table, if desired, or may even deliver the elements to a further apparatus as, for example, to a machine or mechanism by which the elements are deposited in a casing or the like.

In the interest of clarity and simplicity, but one embodiment of the invention has been illustrated and described. It will be evident however that numerous changes and modifications may be made in the mechanisms disclosed without altering the basic principles or modes of operation. These changes which are within the scope of one skilled in the art are considered as encompassed within the ambit of the invention and hence the latter is not to be construed as limited to the specifically illustrated and described details except as may be required by the spirit and scope of the subjoined claims.

Having thus described the invention, we claim:

1. In an apparatus of the character described, means to move assembled elements of non-connected battery plates and separators a predetermined distance means to deliver assembled elements of non-connected battery plates and separators including means to intermittently operate said moving means, a pair of relatively movable jaw members, means to move said jaw members as a unit towards and from said moving means in timed relationship to the movement of the latter, means to produce relative movement between said jaw members in a direction to effect engagement thereof with opposite sides of an element to prevent relative shifting therebetween, a moving supporting means to which the elements are to be delivered, means to rock said jaw members and an element held therein through an arc to position the element for reception by said supporting means, and means operated in timed relationship to the movement of said supporting means to move the element from said jaw members and onto the last-mentioned means.

2. The combination as defined in claim 1 and further comprising means to effect relative movement between said jaw members in the opposite direction including a control means actuated by movement of said jaw members as a unit towards said moving means, whereby said jaw members are spaced to receive an element on said moving means.

3. A machine for manufacturing storage batteries of the lead acid type comprising a support, individual magazines on said support for storing negative battery plates, positive battery plates and plate separators, power actuated means on said support operable to automatically assemble battery elements from the plates and separators of said magazines, burner means spaced on said support from said magazines, carrier means on said support for supporting and moving an assembled battery element into a position to receive a lug connecting strap thereon and subsequently to said burner means for thermally fastening said strap to said battery element, means on said support for moving an assembled battery element to said carrier means, means on said support for moving said carrier means, and control means interconnecting said power actuated means and said last two named means to effect the automatic operation thereof in a predetermined timed relationship to the operation of said power actuated means.

4. A machine for manufacturing storage batteries of the lead acid type comprising a stationary support, individual magazines on said support for storing negative and positive battery plates and plate separators, platform means adjacent said magazines for receiving the plates and separators therefrom, power means including cam means and means actuated by said cam means cooperating with each of said magazines and adapted to deliver a predetermined number of the plates and separators onto said platform means in a superposed relationship to thereby form a battery element, a rotating table on said support, drive means on said support for rotating said table, means comprising an intermittently operated member adjacent to said platform responsive to said cam means and a movable support adjacent said rotating table operative in response to the movements thereof and including rockable jaw members thereon for moving a battery element from said platform and onto said table in a position to receive lug connecting straps thereon, means on said support for burning the lugs onto said battery elements, and control means interconnecting said power means and said drive means to effect the rotation of said table in a timed relationship to the operation of said power means.

5. A machine for manufacturing storage batteries of the lead acid type comprising a stationary support, individual magazines on said support for storing negative and positive battery plates and plate separators, platform means adjacent said magazines for receiving the plates and separators therefrom, power means including cam means and means actuated by said cam means cooperating with each of said magazines and adapted to deliver a predetermined number of the plates and separators onto said platform means in a superposed relationship to thereby form a battery element, a rotating table spaced on said support outwardly from said magazines, drive means on said support for rotating said table, a movable member on said support adjacent to said platform means, means for moving said movable member, means responsive to said cam means for moving a battery element from said platform means and onto said movable member and intermittently operable to actuate the latter, a movable support on said stationary support adjacent said rotating table for moving the battery elements from said movable member onto said rotating table and including rockable jaw members movable to grasp a battery element on said movable member and means responsive to the rotation of said table for actuating said movable support and said jaw members, said last-mentioned responsive means being effective to rock said jaw members to position the element held therein onto said table in a position to receive lug connecting straps, means on said support for burning the connecting straps to the elements, means on said support for taking the connected battery elements off the rotatable table, and control means interconnecting said power means and said drive means and said element take-off means to effect the automatic operation of the last two named means in a timed relationship to the operation of said power means.

6. A machine for manufacturing storage batteries of the lead acid type comprising a stationary support, individual magazines on said support for storing negative and positive battery plates and plate separators, a platform adjacent said magazines for receiving the plates and separators therefrom, power means including cam means and means actuated by said cam means cooperating with each of said magazines and adapted to deliver a predetermined number of the plates and separators onto said platform in a superposed relationship to thereby form a battery element, a rotating table on said support, drive means on said support for rotating said table, means comprising an intermittently operated member adjacent to said platform responsive to said cam means and a movable support adjacent said rotating table and operative in response to the movements thereof and including rockable jaw members thereon for moving the battery element from said platform means and onto said table in a position to receive lug connecting straps thereon, a burner head on said stationary support and adapted to provide a plurality of flames engageable with the lugs on the battery elements, clamping means on said table adapted to receive a battery element therein and operable in a timed relationship to the rotation of said table to clamp together the plates and separators forming the element, protective means carried by said table and adapted to be moved to and from a lug burning position to shield the clamped battery element from the flame, means responsive to the rotation of said table to move said protective means from a lug burning position, means on said table to release said clamping means after said protective means has been moved from a lug burning position, and control means interconnecting said power means and said table drive means to effect the rotation of said table in a timed relationship to the operation of said power means.

7. A machine for manufacturing storage batteries of the lead acid type comprising a stationary support, individual magazines on said support for storing negative and positive battery plates and plate separators, platform means adjacent said magazines for receiving the plates and separators therefrom, power means including cam means and means actuated by said cam means cooperating with each of said magazines and adapted to deliver a predetermined number of the plates and separators onto said platform means in a superposed relationship to thereby form a battery element, a rotating table spaced on said support outwardly from said magazines, drive means on said support for rotating said table, a movable member on said support adjacent to said platform means, means for moving said movable member, means on said support responsive to said cam means for moving a battery element from said platform means and onto said movable member and intermittently operable to actuate the latter, a movable support on said stationary support adjacent said rotating table for moving the battery elements from said movable member onto said rotating table including rockable jaw members arranged to grasp a battery element on said movable member and means responsive to the rotation of said table for actuating said movable support and said jaw members, said last-mentioned responsive means being effective to rock said jaw members to position an element held therein on said table in a position to receive lug connecting straps, a burner head on said stationary support for said table, burner means on said head adapted to provide a plurality of flames engageable with the lugs on a battery element, protective means on said table movable to and from a shielding position for an element thereon to allow the burning of the plate lugs by said head, and means responsive to the movement of said table and connected with said protective means to move same into cooperation with an element prior to and after engaging the flames of said head, means on said support for taking a connected element off said rotatable table and control means interconnecting said power means, said drive means and said takeoff means to effect the automatic operation of the last two named means in a timed relationship to the operation of said power means.

References Cited in the file of this patent

UNITED STATES PATENTS

| Number | Name | Date |
| --- | --- | --- |
| 1,389,155 | Norris | Aug. 30, 1921 |
| 1,979,763 | Olson | Nov. 6, 1934 |
| 2,228,887 | Peterson | Jan. 14, 1941 |
| 2,259,728 | Bridges | Oct. 21, 1941 |
| 2,350,273 | Decker | May 30, 1944 |
| 2,371,748 | Fedorchak | Mar. 20, 1945 |
| 2,430,188 | Sargent | Nov. 4, 1947 |
| 2,609,943 | Winder | Sept. 9, 1952 |
| 2,634,552 | Woolling | Apr. 14, 1953 |
| 2,643,778 | Socke | June 30, 1953 |
| 2,649,975 | Brooks | Aug. 25, 1953 |
| 2,722,305 | McCabe | Nov. 1, 1955 |